US012130052B2

(12) United States Patent
Park et al.

(10) Patent No.: US 12,130,052 B2
(45) Date of Patent: Oct. 29, 2024

(54) HEAT EXCHANGER UNIT AND METHOD FOR MANUFACTURING THE SAME

(71) Applicant: Kyungdong Navien Co., LTD, Gyeonggi-do (KR)

(72) Inventors: Jun Kyu Park, Seoul (KR); Sung Cheul Cho, Seoul (KR)

(73) Assignee: KYUNGDONG NAVIEN CO., LTD., Gyeonggi-do (KR)

( * ) Notice: Subject to any disclaimer, the term of this patent is extended or adjusted under 35 U.S.C. 154(b) by 0 days.

(21) Appl. No.: 17/131,772

(22) Filed: Dec. 23, 2020

(65) Prior Publication Data

US 2021/0199340 A1 Jul. 1, 2021

(30) Foreign Application Priority Data

Dec. 30, 2019 (KR) .................. 10-2019-0178390
Jul. 8, 2020 (KR) .................. 10-2020-0083879

(51) Int. Cl.
*F24H 9/06* (2006.01)
*B23P 15/26* (2006.01)
(Continued)

(52) U.S. Cl.
CPC ............ *F24H 8/00* (2013.01); *B23P 15/26* (2013.01); *F24H 1/0072* (2013.01); *F24H 1/201* (2013.01);
(Continued)

(58) Field of Classification Search
CPC ... F24H 9/06; F24H 9/146; F24H 8/00; F24H 1/0072; F24H 1/201; F24H 7/005;
(Continued)

(56) References Cited

U.S. PATENT DOCUMENTS 2,006,649 A 7/1935 Modine
4,509,672 A * 4/1985 Woodhull, Jr. ....... F28F 9/0202
228/183
(Continued)

FOREIGN PATENT DOCUMENTS

AT 396026 B * 3/1993 ............. F24H 9/146
AT 399772 B * 5/1995 ............. F24H 9/146
(Continued)

OTHER PUBLICATIONS

AT-399772-B USPTO machine translation (Year: 2022).*
(Continued)

*Primary Examiner* — Gregory A Wilson
(74) *Attorney, Agent, or Firm* — McDonald Hopkins LLC

(57) ABSTRACT

A heat exchanger unit according to the present disclosure includes a combustion chamber in which a flame caused by a combustion reaction is located, a heat exchanger for a condensing boiler, the heat exchanger being located under the combustion chamber and including heat exchange pipes that receive heat generated by the combustion reaction and heat heating-water flowing through the heat exchange pipes and a main case having the heat exchange pipes accommodated in an interior space thereof, and a combustion chamber heat insulation pipe that is disposed adjacent to the combustion chamber and that receives the heating-water and allows the heating-water to flow therethrough to thermally insulate the combustion chamber.

17 Claims, 22 Drawing Sheets

(51) Int. Cl.
  *F24H 1/00* (2022.01)
  *F24H 1/20* (2022.01)
  *F24H 7/00* (2022.01)
  *F24H 8/00* (2022.01)
  *F24H 9/14* (2006.01)

(52) U.S. Cl.
  CPC ............... *F24H 7/005* (2013.01); *F24H 9/06* (2013.01); *F24H 9/146* (2013.01); *F28F 2275/04* (2013.01)

(58) Field of Classification Search
  CPC ....... F24H 9/2035; B23K 1/203; B23P 15/26; F28F 2275/04; F28D 21/0007
  USPC ...................................................... 122/18.31
  See application file for complete search history.

(56) References Cited

U.S. PATENT DOCUMENTS

| | | | |
|---|---|---|---|
| 5,346,001 A | 9/1994 | Rieke et al. | |
| 5,359,989 A | 11/1994 | Chase et al. | |
| 5,437,248 A * | 8/1995 | Miura | F24H 1/36 |
| | | | 122/18.31 |
| 5,761,808 A * | 6/1998 | Patel | F28D 1/0475 |
| | | | 29/890.052 |
| 6,059,174 A * | 5/2000 | Kojima | B23K 35/3605 |
| | | | 228/183 |
| 6,923,013 B2 | 8/2005 | Chiang et al. | |
| 7,096,933 B1 | 8/2006 | Zia et al. | |
| 7,353,781 B2 | 4/2008 | Jung et al. | |
| 10,126,014 B2 | 11/2018 | Kim | |
| 10,254,053 B2 | 4/2019 | Okamoto et al. | |
| 10,393,404 B2 | 8/2019 | Kondo et al. | |
| 10,408,549 B2 * | 9/2019 | Oohigashi | F28D 1/05375 |
| 10,605,484 B2 | 3/2020 | Park et al. | |
| 10,612,776 B2 | 4/2020 | Ono et al. | |
| 10,823,455 B2 | 11/2020 | Park et al. | |
| 10,890,356 B2 | 1/2021 | Shiotsu et al. | |
| 10,928,063 B2 | 2/2021 | Ono et al. | |
| 2004/0031480 A1 | 2/2004 | Jung et al. | |
| 2007/0204980 A1 | 9/2007 | Kim et al. | |
| 2010/0116226 A1 | 5/2010 | Lovascio | |
| 2010/0307727 A1 | 12/2010 | Min | |
| 2011/0114300 A1 | 5/2011 | Kim et al. | |
| 2013/0125838 A1 | 5/2013 | Min | |
| 2013/0180689 A1 * | 7/2013 | Boning | B21C 37/225 |
| | | | 29/890.053 |
| 2013/0216962 A1 | 8/2013 | Dresner et al. | |
| 2015/0204579 A1 | 7/2015 | Brown et al. | |
| 2015/0300687 A1 | 10/2015 | Cui | |
| 2016/0273850 A1 * | 9/2016 | Okamoto | F28F 1/32 |
| 2016/0377320 A1 | 12/2016 | Kim | |
| 2017/0059205 A1 | 3/2017 | Kim | |
| 2017/0108281 A1 * | 4/2017 | Klaves | F28F 9/0243 |
| 2017/0335740 A1 * | 11/2017 | Dries | F01N 5/02 |
| 2018/0087806 A1 | 3/2018 | Kondo et al. | |
| 2018/0216848 A1 | 8/2018 | Jeong | |
| 2018/0238639 A1 | 8/2018 | Jeong | |
| 2018/0363897 A1 | 12/2018 | Ono et al. | |
| 2018/0363948 A1 | 12/2018 | Park et al. | |
| 2018/0372311 A1 * | 12/2018 | Ono | F24H 9/02 |
| 2019/0226719 A1 * | 7/2019 | Shiotsu | F24H 1/403 |
| 2021/0199340 A1 | 7/2021 | Park et al. | |
| 2021/0247102 A1 | 8/2021 | Park et al. | |
| 2021/0247103 A1 | 8/2021 | Park et al. | |

FOREIGN PATENT DOCUMENTS

| | | | | |
|---|---|---|---|---|
| CA | 2978765 A1 * | 3/2018 | ............... | F24H 9/06 |
| CN | 1460820 A | 12/2003 | | |
| CN | 1605812 A | 4/2005 | | |
| CN | 2842210 Y | 11/2006 | | |
| CN | 101782270 A | 7/2010 | | |
| CN | 101903711 A | 12/2010 | | |
| CN | 102901221 A | 1/2013 | | |
| CN | 103069225 A | 4/2013 | | |
| CN | 205299948 U * | 6/2016 | ............. | F24H 1/124 |
| CN | 105987632 A | 10/2016 | | |
| CN | 106133456 A | 11/2016 | | |
| CN | 205690651 U | 11/2016 | | |
| CN | 206478864 U | 9/2017 | | |
| CN | 107923653 A | 4/2018 | | |
| CN | 1370964 A | 9/2022 | | |
| DE | 102017212965 B4 * | 11/2020 | ............... | F24H 1/40 |
| EP | 0195383 A2 * | 9/1986 | ............... | F24H 8/00 |
| EP | 0685698 A | 12/1995 | | |
| EP | 0687870 B1 | 1/2000 | | |
| EP | 1026454 A2 | 8/2000 | | |
| EP | 1139036 A2 * | 10/2001 | ............. | F24H 9/146 |
| EP | 1026454 B1 | 4/2006 | | |
| EP | 2722610 A1 | 4/2016 | | |
| EP | 3173722 A | 5/2017 | | |
| FI | 396026 B * | 3/1993 | ............. | F24H 9/146 |
| FR | 2640028 A2 | 6/1990 | | |
| JP | S60-106058 U | 7/1985 | | |
| JP | 2003-021390 A | 1/2003 | | |
| JP | 2003-161527 A | 6/2003 | | |
| JP | 2005326102 A | 11/2005 | | |
| JP | 2006153375 A | 6/2006 | | |
| JP | 2006284037 A | 10/2006 | | |
| JP | 2019095116 A * | 6/2019 | ............ | F24H 9/0026 |
| JP | 2019-128083 A | 8/2019 | | |
| KR | 10-1999-0000646 A | 1/1999 | | |
| KR | 20-1999-0000409 U | 1/1999 | | |
| KR | 10-0219911 B1 | 9/1999 | | |
| KR | 10-2000-0057855 A | 9/2000 | | |
| KR | 200219877 Y1 * | 4/2001 | ............. | F24H 9/122 |
| KR | 200219877 Y1 | 4/2001 | | |
| KR | 10-2001-0049983 A | 6/2001 | | |
| KR | 20-0257930 Y | 12/2001 | | |
| KR | 10-2002-0000703 A | 1/2002 | | |
| KR | 10-2002-0001465 A | 1/2002 | | |
| KR | 100392593 B1 | 1/2002 | | |
| KR | 20020000703 A * | 1/2002 | ............... | F24H 1/00 |
| KR | 20020067301 A | 8/2002 | | |
| KR | 10-0361553 B | 11/2002 | | |
| KR | 10-0386960 B | 6/2003 | | |
| KR | 1020050000127 A | 1/2005 | | |
| KR | 10-2006-0000590 A | 1/2006 | | |
| KR | 10-0570286 B1 | 4/2006 | | |
| KR | 10-0570291 B | 4/2006 | | |
| KR | 100975104 B1 * | 11/2008 | ............. | Y02B 30/00 |
| KR | 10-2009-0047901 A | 5/2009 | | |
| KR | 10-0896407 B | 5/2009 | | |
| KR | 20090067760 A1 | 6/2009 | | |
| KR | 100933419 B1 | 12/2009 | | |
| KR | 10-20100054384 A | 5/2010 | | |
| KR | 10-2010-0117842 A | 11/2010 | | |
| KR | 10-2010-0128505 A | 12/2010 | | |
| KR | 10-2011-0077307 A | 7/2011 | | |
| KR | 10-2011-0077308 A | 7/2011 | | |
| KR | 20140083626 A * | 12/2012 | ............... | F24H 9/16 |
| KR | 10-2014-0051760 A | 5/2014 | | |
| KR | 20140051760 A * | 5/2014 | ............... | F24H 1/26 |
| KR | 10-2014-0083626 A | 7/2014 | | |
| KR | 10-1445786 B1 | 10/2014 | | |
| KR | 101586646 B1 | 9/2015 | | |
| KR | 102546693 B1 * | 7/2016 | | |
| KR | 10-2017-0031338 A | 3/2017 | | |
| KR | 1020170025476 A | 3/2017 | | |
| KR | 10-2017-0067491 A | 6/2017 | | |
| KR | 2020170003855 U | 11/2017 | | |
| KR | 10-1810122 B1 | 12/2017 | | |
| KR | 10-2018-0007933 A | 1/2018 | | |
| KR | 10-2018-0007984 A | 1/2018 | | |
| KR | 20180007933 A | 1/2018 | | |
| KR | 10-2018-0087986 A | 8/2018 | | |
| KR | 10-2018-0097681 A | 8/2018 | | |
| KR | 10-2018-0097682 A | 8/2018 | | |
| KR | 10-2019-0132043 A | 11/2019 | | |
| KR | 10-2019-0138553 A | 12/2019 | | |
| KR | 10-2019-0138554 A | 12/2019 | | |
| KR | 10-2019-0138555 A | 12/2019 | | |

(56) References Cited

FOREIGN PATENT DOCUMENTS

| KR | 10-2019-0138585 A | 12/2019 |
|---|---|---|
| KR | 10-2021-0032347 A | 3/2021 |
| KR | 10-2021-0032348 A | 3/2021 |
| KR | 10-2021-0039363 A | 4/2021 |
| WO | 2006097959 A1 | 9/2006 |
| WO | 2007102653 A1 | 9/2007 |
| WO | 2008056238 A2 | 5/2008 |
| WO | 2012020909 A | 2/2012 |
| WO | 2012177154 A | 12/2012 |
| WO | 2014104575 A | 7/2014 |
| WO | 2017099381 A | 6/2017 |

OTHER PUBLICATIONS

KR-200219877-Y1 maching translation (Year: 2022).*
CN-205299948-U maching translation (Year: 2022).*
KR-20020000703-A maching translation (Year: 2022).*
AT-396026-B maching translation (Year: 2022).*
EP-1139036-A2 maching translation (Year: 2022).*
CA-2978765-A1 maching translation (Year: 2022).*
KR-20140051760-A maching translation (Year: 2022).*
Office Action for corresponding Chinese Patent Application No. 202011606440.3, dated May 30, 2022, 21 pages.
Office Action for corresponding Korean Patent Application No. 10-2020-0083879, dated Jun. 14, 2022, 9 pages.
Office Action for related U.S. Appl. No. 16/973,025, dated Jul. 7, 2022, 19 pages.
Notification of Third Party Submission for related Korean Patent Application No. 10-2019-0178390 dated Jan. 17, 2022, 2 pages long.
Notification of Third Party Submission for related Korean Patent Application No. 10-2019-0178390 dated Mar. 31, 2022, 2 pages long.
Office Action dated Jan. 14, 2022, for related U.S. Appl. No. 16/973,025 (pp. 1-5).
Notification of Third Party Submission for related Korean Patent Application No. 10-2021-0032298 dated Dec. 29, 2021, 2 pages long.
Notification of Third Party Submission for related Korean Patent Application No. 10-2021-0032298 dated Feb. 10, 2022, 2 pages long.
Notice of Reason for Cancellation for related Korean Patent Application No. 10-2018-0156356 dated Feb. 24, 2022, 13 pages long.
"6. Report on Development of Multi-Stage Core Type Oil Cooling Systems for Marine and Industrial Use" (Final Version) issued on Jun. 2005, pp. 11, 12 and 34.
First Office Action for corresponding Chinese Patent Application No. 201980037912.7, dated Nov. 1, 2021, 9 pages long.
Notice of Allowance for related Korean Patent Application No. 10-2018-0156357 received on Nov. 17, 2021, 2 pages long.
First Office Action for related Chinese Patent Application No. 201980038009.2, dated Nov. 16, 2021, 10 pages long.
Extended European Search Report for European Application No. 19814828.0 dated Jun. 9, 2021, 7 pages long.
First Office Action for Korean Patent Application No. 10-2021-0032298 dated Jun. 18, 2021, 6 pages long.
First Office Action for Korean Patent Application No. 10-2021-0039671 dated Jun. 18, 2021, 6 pages long.
Extended European Search Report for European Application No. 19814468.5 dated Jul. 5, 2021, 9 pages long.
Extended European Search Report for related EP Application No. 20217737.4 dated May 11, 2021, 8 pages long.
Office Action for related Korean Patent Application No. 10-2022-0119550, dated Nov. 30, 2022, 8 pages.
Office Action for related U.S. Appl. No. 16/973,016, dated Sep. 15, 2022, 46 pages.
International Search Report and Written Opinion for International Patent Application No. PCT/KR2019/006543 dated Aug. 29, 2019, 9 pages long.
State Intellectual Property Office of People's Republic of China, Notification of First Office Action for related Application No. 202210757708.6 report issue date Mar. 28, 2023, 9 pages, China.
Development of Ultra-Efficient Green Condensing Gas Boiler, pp. 1-160, publication date: May of 2013, publisher: Kiturami Co. Ltd., place of publication: https://www.ntis.go.kr/outcomes/popup/srchTotlRschRpt.do?cmd=get_contents&rstId=REP-2013-0118225187&tapGubun=baseInfo.
Concise Description of Relevance of Prior Art, filed with USPTO for U.S. Appl. No. 17/709,444, filed Dec. 14, 2022.
Concise Description of Relevance of Prior Art, filed with USPTO for U.S. Appl. No. 17/709,450, filed Dec. 14, 2022.
Concise Description of Relevance of Prior Art, filed with USPTO for U.S. Appl. No. 17/709,568, filed Dec. 14, 2022.
Korean Patent Office, Notification of First Office Action for corresponding application No. 10-2023-0064904, issued on Jun. 29, 2023, Korea, 6 pages.
State Intellectual Property Office of People's Republic of China, Notification of First Office Action for related Application No. 202210757708.6 report issue date Mar. 27, 2023, 9 pages, China.
State Intellectual Property Office of People's Republic of China, Notification of First Office Action for related Application No. 202210759593.4 report issue date Mar. 27, 2023, 9 pages, China.
Korean Patent Office, Notification of First Office Action for related application No. 10-2023-0108464, issued on Sep. 15, 2023, Korea, 7 pages.
Korean Patent Office, Notification of Preliminary Rejection for related application No. 10-2022-0119550, issued on Sep. 15, 2023, Korea, 5 pages.
Chinese Patent Office, Notice of Allowance for corresponding application No. 202210759593.4, issued on Sep. 28, 2023, China, 5 pages.
United States Patent Office, Non Final Office Action for related U.S. Appl. No. 16/973,016 report issued on Mar. 7, 2024, United States, 13 pages.
Korean Patent Office, Notification of First Office Action for corresponding application No. 10-2024-0040455, issued on Jun. 18, 2024, Korea, 10 pages.
Ahn et al., Brazing Technology for Heat Exchangers, Journal of KWS, vol. 17, No. 2, Apr. 1999, pp. 9-17.
Third Party Submission dated Jul. 2, 2024, Korean Patent Application No. 10-2024-0040455, 2 pages.
Third Party Submission dated Jul. 28, 2024, related U.S. Appl. No. 18/099,223. 25 pages.

* cited by examiner

HEAT EXCHANGER UNIT AND METHOD FOR MANUFACTURING THE SAME

CROSS-REFERENCE TO RELATED APPLICATION

This application claims the benefit of priority to Korean Patent Application Nos. 10-2019-0178390 and 10-2020-0083879, filed in the Korean Intellectual Property Office on Dec. 30, 2019 and Jul. 8, 2020, respectively, the entire contents of which are incorporated herein by reference.

TECHNICAL FIELD

The present disclosure relates to a heat exchanger unit used in a water-heating device, such as a condensing boiler, and a method for manufacturing the heat exchanger unit.

BACKGROUND

A water-heating device is a device for heating water. A boiler, a kind of the water-heating device, is device for heating a desired area by heating fluid in a container. To heat up heating-water of the boiler, the boiler generally has a heat source, a burner including the heat source, and a heat exchanger unit for heating the heating-water using a combustion gas. In a condensing boiler comprehensively using heat of a combustion gas, sensible heat generated from a burner is supplied to heating-water, and the sensible heat of the combustion gas generated from the burner and latent heat caused by a phase change of the combustion gas are supplied to the heating-water. Accordingly, the heating-water is heated.

To supply the sensible heat and the latent heat to the heating-water, a method of locating a container for storing the heating-water in a position close to a flow area of the combustion gas and a heat source for supplying sensible heat is mainly used. Heat is indirectly transferred to the heating-water through the container to raise the temperature of the heating-water to a temperature appropriate for heating, and thereafter the heating-water is supplied to an area that has to be heated.

A plate type heat exchanger unit having a plurality of plates stacked is mainly used for heat transfer. However, the plate type heat exchanger unit has problems of difficulty in a manufacturing process and high cost despite excellent thermal efficiency.

SUMMARY

The present disclosure has been made to solve the above-mentioned problems occurring in the prior art while advantages achieved by the prior art are maintained intact.

An aspect of the present disclosure is to provide a heat exchanger unit used in a water-heating device, such as a condensing boiler, which has excellent thermal efficiency while using a fin-tube type heat exchange device, and a method for manufacturing the heat exchanger unit.

Another aspect of the present disclosure is to provide a heat exchanger unit used in a water-heating device, such as a condensing boiler, in which an appropriate thermal insulation means is used, and a method for manufacturing the heat exchanger unit.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a heat exchanger unit includes a combustion chamber in which a flame caused by a combustion reaction is located, a heat exchanger for a condensing boiler, the heat exchanger being located under the combustion chamber and including heat exchange pipes that receive heat generated by the combustion reaction and heat heating-water flowing through the heat exchange pipes and a main case having the heat exchange pipes accommodated in an interior space thereof, and a combustion chamber heat insulation pipe that is disposed adjacent to the combustion chamber and that receives the heating-water and allows the heating-water to flow therethrough to thermally insulate the combustion chamber.

According to another aspect of the present disclosure, a method for manufacturing a heat exchanger unit includes assembling a heat exchanger using a paste for brazing, assembling a combustion chamber using a paste for brazing, assembling the combustion chamber and a combustion chamber heat insulation pipe, applying a paste for brazing to at least one of one surface of the combustion chamber that is to be brought into contact with the heat exchanger or one surface of the heat exchanger that is to be brought into contact with the combustion chamber, forming the heat exchanger unit by seating the heat exchanger on the combustion chamber, and performing brazing by heating the heat exchanger unit.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
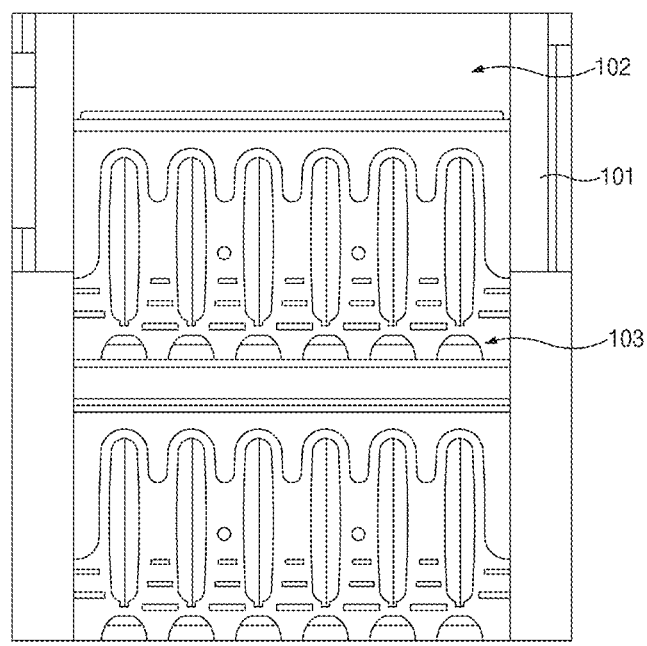
FIG. 1 is a vertical sectional view of part of an exemplary heat exchanger unit.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

As a method of arranging a burner, heat exchangers, and a combustion chamber constituting a condensing boiler, a method of configuring the condensing boiler by locating the burner at the lowermost position and sequentially arranging the combustion chamber surrounded by a heat insulating material of a dry type, a sensible heat exchanger of a fin-tube type, and a latent heat exchanger of a plate type over the burner may be considered. This type of condensing boiler is referred to as a bottom-up boiler. In the case of the bottom-up boiler, condensate generated by condensation of a combustion gas in the latent heat exchanger may fall onto the sensible heat exchanger and the combustion chamber. Therefore, the sensible heat exchanger and the heat insulating material of the dry type that surrounds the combustion chamber may be easily corroded by the condensate with high acidity. Furthermore, as the different types of heat exchangers are connected with each other, manufacturing costs may be increased due to additional connecting parts.

To solve the problems caused by the condensate, a method of configuring a condensing boiler by locating a burner at the uppermost position and sequentially arranging a combustion chamber thermally insulated by being surrounded by a heat insulation pipe, a sensible heat exchanger of a fin-tube type, and a latent heat exchanger of a plate type under the burner may be considered. This type of condensing boiler is referred to as a top-down boiler. In this case, as the latent heat exchanger is located at the lowermost position, condensate is immediately discharged through a condensate receiver and does not reach the sensible heat exchanger or the combustion chamber, and thus a problem of corrosion may be solved. However, many parts including the heat insulation pipe used to cool the combustion chamber are used, and due to this, the number of assembly steps is increased, which leads to an increase in manufacturing costs. Furthermore, as the different types of heat exchangers are connected with each other, manufacturing costs may be increased due to additional connecting parts.

FIG. 1 is a vertical sectional view of part of an exemplary heat exchanger unit. As illustrated in FIG. 1, a top-down boiler may be used, and a method of performing thermal insulation in a dry type by surrounding a combustion chamber 102 and a sensible heat exchanger 103 with a heat insulating material 101 may be considered. That is, the heat insulating material 101 of a dry type, which is used for the combustion chamber 102, may insulate heat radiated from the sensible heat exchanger 103. However, in this case, due to an excessive flame generated through a combustion reaction and excessive heat generated from a combustion gas, the heat insulating material 101 may be damaged, and the durability of the heat insulating material 101 may be deteriorated. Furthermore, condensate is more likely to be generated in a position adjacent to the sensible heat exchanger 103 than in the combustion chamber 102, and therefore when the heat insulating material 101, as in the drawing, further extends downward beyond the position that the combustion chamber 102 extends downward and reaches, the condensate may make contact with the dry-type heat insulating material 101 so that the heat insulating material 101 may be damaged.

Figure 2:
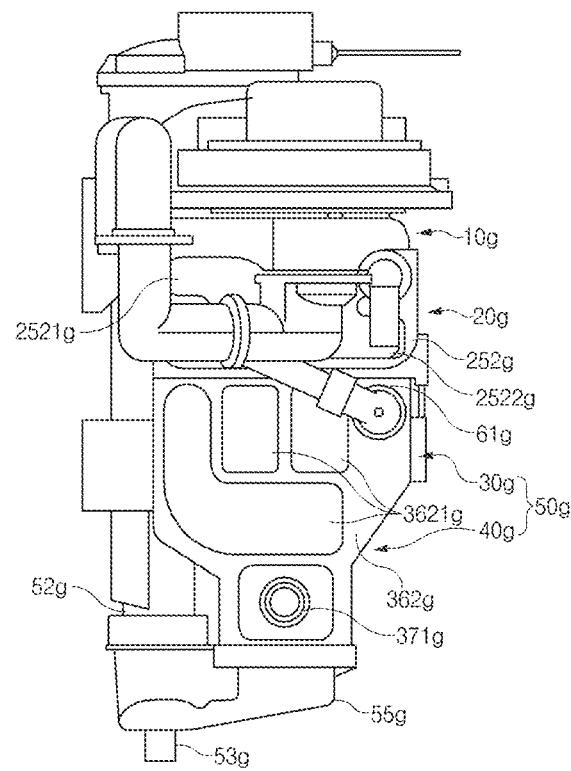
FIG. 2 is a front view of a condensing boiler according to an embodiment of the present disclosure.
Figure 3:
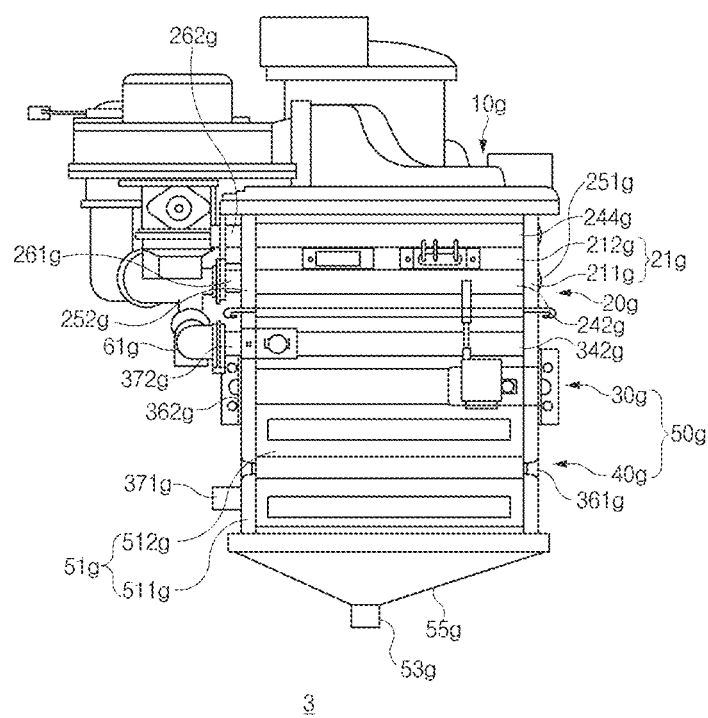
FIG. 3 is a side view of the condensing boiler according to an embodiment of the present disclosure.
Figure 4:
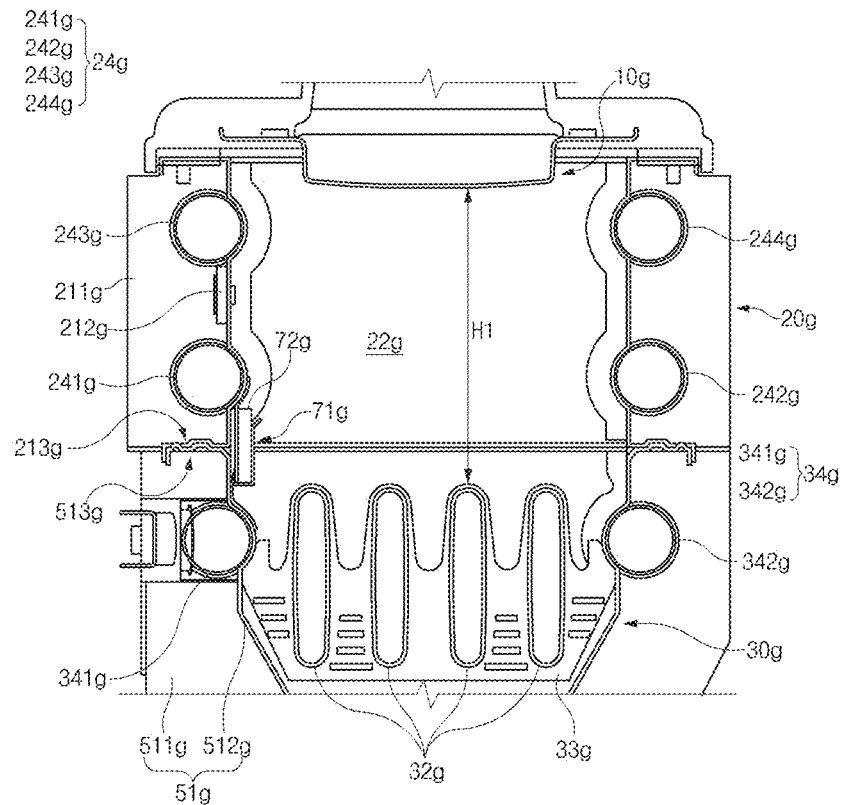
FIG. 4 is a view illustrating part of a vertical cross-section of the condensing boiler according to an embodiment of the present disclosure.
Figure 5:
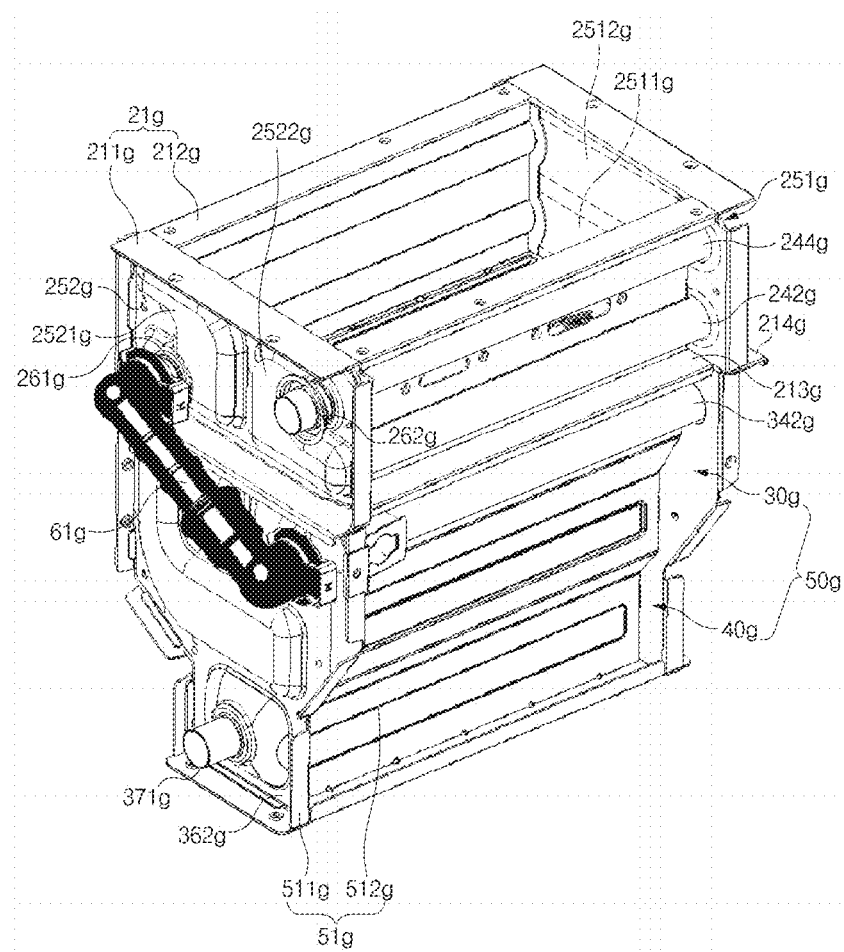
FIG. 5 is a perspective view of a heat exchanger unit according to an embodiment of the present disclosure.

FIG. 2 is a front view of a condensing boiler 3 according to an embodiment of the present disclosure. FIG. 3 is a side view of the condensing boiler 3 according to an embodiment of the present disclosure. FIG. 4 is a view illustrating part of a vertical cross-section of the condensing boiler 3 according to an embodiment of the present disclosure. FIG. 5 is a perspective view of a heat exchanger unit according to an embodiment of the present disclosure.

Referring to FIGS. 2 to 5, the condensing boiler 3, a kind of a water-heating device, according to an embodiment of the present disclosure may include the heat exchanger unit and may further include a main flow passage, a burner assembly 10g, and the like.

The condensing boiler 3 will be described as a representative example of a water-heating device. However, the water-heating device may be a different type of device, such as a water heater, or the like.

The burner assembly 10g and the heat exchanger unit are disposed in sequence along a reference direction that is a flow direction of a combustion gas. In the heat exchanger unit, components are arranged along the same direction in the order of a combustion chamber 20g, a sensible heat exchanger 30g, a latent heat exchanger 40g, and sensible heat insulation pipes 34g disposed together with the sensible heat exchanger 30g. The flow direction of the combustion gas may be a downward direction in FIGS. 2 to 5.

The heat exchanger unit and the condensing boiler 3 using the same according to an embodiment of the present disclosure will be described based on a top-down condensing boiler 3 in which a combustion gas flows vertically downward. Accordingly, the flow direction of the combustion gas that is represented by an arrow may be the same as the vertical downward direction in the position where the condensing boiler 3 is installed. As the top-down condensing boiler 3 is selected, condensate caused by condensation of the combustion gas may be generated only at the lowermost side of the condensing boiler 3 and may be immediately discharged to the outside through a lower end of the condensing boiler 3. Thus, corrosion of the components constituting the condensing boiler 3 may be prevented. However, the configuration of the present disclosure may be used for a bottom-up condensing boiler capable of naturally forming a path of heating-water in the downward direction by using a property by which a heated combustion gas is moved upward by convection.

The condensing boiler 3 according to an embodiment of the present disclosure may include a condensate receiver 55g disposed at the most downstream side along the flow direction of the combustion gas. When the condensate generated from the latent heat exchanger 40g falls vertically downward by the weight of the condensate, the condensing boiler 3 may collect the condensate using the condensate receiver 55g. The condensate receiver 55g may have an inner surface inclined toward a condensate outlet 53g to discharge the collected condensate through the condensate outlet 53g extending vertically downward.

Furthermore, an exhaust duct 52g may be fluidically connected with the condensate receiver 55g to discharge a residual combustion gas at the same time that the condensate is discharged. 'Fluidically connected' means two components are connected such that fluid can be transferred to each other. The exhaust duct 52g extends vertically upward and discharges the residual combustion gas to the outside.

Main Flow Passage

The condensing boiler 3 including the heat exchanger unit according to an embodiment of the present disclosure includes the main flow passage. The main flow passage is a pipe that is directly or indirectly connected to a heating flow passage for providing heating and that supplies heating-water to the heating flow passage. The main flow passage is directly or indirectly connected to the sensible heat exchanger 30g or the latent heat exchanger 40g. The main flow passage supplies the heating-water to the heat exchanger such that the heating-water is heated, or the main flow passage supplies the heated heating-water from the heat exchanger to the heating flow passage. Accordingly, the main flow passage may include a heating-water pipe connected with the sensible heat exchanger 30g and the latent heat exchanger 40g to supply or receive the heating-water.

Burner Assembly 10g

The burner assembly 10g includes a burner that radiates heat. The burner assembly 10g receives fuel and air and triggers a combustion reaction to generate a combustion gas.

A premix burner may be used as the burner assembly 10g used in the condensing boiler 3 according to an embodiment of the present disclosure. The premix burner receives air and fuel, mixes the air and the fuel at a predetermined ratio, burns the air-fuel mixture using radiating heat, and generates a combustion gas. For this operation, the burner assembly 10g according to an embodiment of the present disclosure may include a mix chamber that receives fuel and air, mixes the fuel and the air at a predetermined ratio, and prepares an air-fuel mixture for a combustion reaction and the burner that applies heat to the air-fuel mixture prepared by the mix chamber. The burner assembly 10g having the above-described structure is provided to obtain optimal fuel efficiency and thermal efficiency by causing a combustion reaction by heating air and fuel mixed at a ratio appropriate for a combustion reaction.

The condensing boiler 3 of the present disclosure may further include a blower that supplies air into the mix chamber and blows a combustion gas generated in the burner assembly 10g in the vertically downward direction. The blower may include a pump that is connected with the mix chamber and that forcibly delivers air toward the burner assembly 10g that is connected to the mix chamber in the vertically downward direction.

Sensible Heat Exchanger 30g

The heat exchanger unit includes the sensible heat exchanger 30g, the latent heat exchanger 40g, and the sensible heat insulation pipes 34g. The components included in the heat exchanger unit may be fixed in the illustrated positions.

The sensible heat exchanger 30g is disposed downstream of the combustion chamber 20g with respect to the flow direction of the combustion gas. The sensible heat exchanger 30g receives, by radiation of heat and convection of the combustion gas, sensible heat generated by the combustion reaction triggered by the burner assembly 10g located over the sensible heat exchanger 30g and heats the heating-water flowing in the sensible heat exchanger 30g.

Specifically, the sensible heat exchanger 30g includes a sensible heat exchange pipe 32g through which the heating-water flows and around which the combustion gas flows and a sensible heat exchanger case into which opposite ends of the sensible heat exchange pipe 32g are inserted. The sensible heat exchange pipe 32g is located in the sensible heat exchanger case, and the combustion gas flows around the sensible heat exchange pipe 32g and indirectly exchanges heat with the heating-water.

The sensible heat exchange pipe 32g extends along a predetermined direction in a space formed in the sensible heat exchanger case. The predetermined direction may preferably be a direction perpendicular to the flow direction of the combustion gas. The sensible heat exchange pipe 32g may include a plurality of straight portions spaced apart from each other along an orthogonal direction that is perpendicular to the predetermined direction and the flow direction of the combustion gas.

The plurality of straight portions are arranged, and flow passage cap plates 361g and 362g, which will be described below, connect end portions of the straight portions inserted into insertion holes formed in general sensible heat side plates of the sensible heat exchanger case that will be described below. A set of the straight portions forms the single sensible heat exchange pipe 32g. Accordingly, a continuous winding flow passage of the heating-water may be formed by the arrangement of the sensible heat exchange pipe 32g.

A turbulator (not illustrated) that has a shape that hampers a flow of the heating-water to make the flow of the heating-water turbulent may be disposed in the sensible heat exchange pipe 32g.

The sensible heat exchanger case may include two general side plate portions spaced apart from each other in the predetermined direction and parallel to each other and two heat insulation side plate portions spaced apart from each other along the orthogonal direction perpendicular to the predetermined direction and parallel to each other and may be formed in a rectangular parallelepiped shape. The general side plate portions and the heat insulation side plate portions may be general side plates and heat insulation side plates that are separate from each other, or may be partial areas of a side plate of an integrated heat exchanger case. In this disclosure, it will be exemplified that the general side plate portions and the heat insulation side plate portions are formed of general side plates and heat insulation side plates that are separate from each other.

General sensible heat side plates and sensible heat insulation side plates form the interior space of the sensible heat exchanger case. Here, the sensible heat insulation side plates are used with the meaning of side plates to which the sensible heat insulation pipes 34g are disposed to be adjacent, rather than the meaning of side plates that reduce the amount of heat transferred to the outside, thereby achieving thermal insulation.

The general sensible heat side plates may include two general sensible heat side plates spaced apart from each other along the predetermined direction, and opposite ends of each of the straight portions constituting the sensible heat exchange pipe 32g may be inserted into the two general sensible heat side plates. Accordingly, the straight portions may be accommodated in the sensible heat exchanger case. The combustion gas flows in the space formed in the sensible heat exchanger case and moves from the combustion chamber 20g to a latent heat exchanger case that will be described below.

The sensible heat insulation pipes 34g may be disposed adjacent to the sensible heat exchanger 30g. The sensible heat insulation pipes 34g are pipe-shaped components through which the heating-water flows to thermally insulate the sensible heat exchanger 30g. Here, the thermal insulation includes both confining heat in any position so as to prevent heat transfer and absorbing heat released from any position to the outside so as to make the amount of heat finally released to the outside less than before.

Specifically, the sensible heat insulation pipes 34g may be disposed adjacent to the outsides of the sensible heat insulation side plates. The sensible heat insulation pipes 34g may be disposed adjacent to the sensible heat insulation side plates, respectively. The sensible heat insulation pipes 34g may be disposed to make contact with the outsides of the sensible heat insulation side plates, or the sensible heat insulation pipes 34g may be disposed in positions spaced apart from the outsides of the sensible heat insulation side plates.

Referring to the drawings, in the heat exchanger unit according to an embodiment of the present disclosure, a first sensible heat insulation pipe 341g and a second sensible heat insulation pipe 342g are spaced apart from each other and are disposed along the outsides of the sensible heat insulation side plates. The sensible heat insulation pipes 34g are located outside the sensible heat exchanger case through which the combustion gas passes, and therefore the sensible heat insulation pipes 34g may not cross or meet the combustion gas. The sensible heat insulation pipes 34g may not be used for heat exchange between the combustion gas and the heating-water, but may perform only a thermal insulation function of blocking release of heat from the sensible heat exchanger 30g to the outside by using the heating-water.

The sensible heat insulation pipes 34g may be spaced apart from the combustion chamber 20g along the flow direction of the combustion gas without making contact with the combustion chamber 20g. Accordingly, the sensible heat insulation pipes 34g may not be used for thermal insulation of the combustion chamber 20g, but may be used only for thermal insulation of the sensible heat exchanger 30g.

The sensible heat insulation pipes 34g, together with the sensible heat exchange pipe 32g, forma sensible heat flow passage through which the heating-water flows.

As illustrated, interior spaces of the sensible heat insulation pipes 34g may have a circular shape in a cross-section obtained by cutting the sensible heat insulation pipes 34g with a plane perpendicular to the direction in which the sensible heat insulation pipes 34g extend. Specifically, the interior spaces of the sensible heat insulation pipes 34g may have a circular with a long axis parallel to the flow direction of the combustion gas. However, the interior spaces of the sensible heat insulation pipes 34g may have an oval shape.

The sensible heat insulation pipes 34g may be located adjacent to the sensible heat insulation side plates of the sensible heat exchanger 30g and may be disposed at an upstream side with respect to the flow direction of the combustion gas. That is, the sensible heat insulation pipes 34g may be disposed closer to the combustion chamber 20g than the latent heat exchanger 40g that will be described below. A flame generated by the burner assembly 10g in the combustion chamber 20g may reach a downstream side of the combustion chamber 20g with respect to the flow direction of the combustion gas, and therefore an upstream side of the sensible heat exchanger 30g that makes contact with the combustion chamber 20g may have the highest temperature. Accordingly, the sensible heat insulation pipes 34g may be disposed adjacent to the upstream side of the sensible heat exchanger 30g and may thermally insulate the upstream side of the sensible heat exchanger 30g from which a large amount of heat is released due to the largest temperature difference between an interior space of the sensible heat exchanger 30g and the outside. However, the sensible heat insulation pipes 34g may be located in the center with respect to the flow direction of the combustion gas.

The sensible heat exchanger 30g may further include a sensible heat fin 33g for raising the thermal conductivity of the sensible heat exchange pipe 32g, and thus the sensible heat exchanger 30g of a fin-tube type may be configured. The sensible heat fin 33g is formed in a plate shape that is perpendicular to the direction in which the sensible heat exchange pipe 32g extends, and the sensible heat exchange pipe 32g passes through the sensible heat fin 33g. The sensible heat fin 33g may include a plurality of sensible heat fins 33g. The sensible heat fins 33g may be spaced apart from each other at predetermined intervals along the predetermined direction in which the sensible heat exchange pipe 32g extends. The sensible heat exchange pipe 32g and the sensible heat fins 33g may be formed of a metallic material with high thermal conductivity, and the sensible heat fins 33g may increase the surface area of the sensible heat exchange pipe 32g through which the sensible heat is received, thereby enabling a larger amount of sensible heat to be transferred to the heating-water.

In a cross-section obtained by cutting the sensible heat exchange pipe 32g with a plane perpendicular to the predetermined direction in which the sensible heat exchange pipe 32g extends, an interior space of the sensible heat exchange pipe 32g may have the shape of a long narrow hole that extends along the flow direction of the combustion gas. As illustrated in the drawings, the sensible heat exchange pipe 32g according to an embodiment of the present disclosure may have a flat long hole shape in which a value obtained by dividing the length of the interior space of the sensible heat exchange pipe 32g in the cross-section with respect to the flow direction of the combustion gas by the width of the interior space of the sensible heat exchange pipe 32g along the direction perpendicular to the flow direction of the combustion gas equals 2 or more.

When the flat type pipe having the above-described shape is employed for the sensible heat exchange pipe 32g, the heating-water may receive a larger amount of heat and may be sufficiently heated due to a wider heat exchange area in the relationship with the combustion gas even though the heating-water flows along the sensible heat exchange pipe 32g having the same length, as compared with when a pipe having a different shape, such as a circular shape or an oval shape, is employed for the sensible heat exchange pipe 32g.

The sensible heat fins 33g may have through-holes through which the sensible heat exchange pipe 32g passes. The areas of the through-holes may be equal to or smaller than the cross-sectional area of the sensible heat exchange pipe 32g. Accordingly, the sensible heat exchange pipe 32g may be firmly inserted into the through-holes of the sensible heat fins 33g. Furthermore, the sensible heat fins 33g may be integrally coupled with the sensible heat exchange pipe 32g through brazing welding.

However, the sensible heat insulation pipes 34g are not coupled with the sensible heat fins 33g. The sensible heat insulation pipes 34g are not fastened with the sensible heat fins 33g, and the sensible heat insulation pipes 34g and the sensible heat fins 33g may be disposed on opposite sides of the sensible heat insulation side plates. The sensible heat fins 33g and the sensible heat insulation pipes 34g may make contact with the sensible heat insulation side plates. However, the sensible heat fins 33g and the sensible heat insulation pipes 34g do not make direct contact with each other. Because the sensible heat insulation pipes 34g, as described above, are disposed for thermal insulation of the sensible heat exchanger 30g rather than for heat exchange between the combustion gas and the heating-water, the sensible heat fins 33g and the sensible heat insulation pipes 34g are not directly connected with each other. Accordingly, the sensible heat fins 33g and the sensible heat insulation pipes 34g are disposed so as not to cross each other.

Louver holes may be additionally formed through the sensible heat fins 33g along the predetermined direction in which the sensible heat exchange pipe 32g extends. The louver holes are formed by punching and include a burr raised along the periphery thereof. When the combustion gas flows, the burr blocks the combustion gas to cause the combustion gas to flow around the sensible heat exchange pipe 32g, thereby facilitating heat exchange between the combustion gas and the heating water.

Each of the sensible heat fins 33g may further include valleys and ridges. The sensible heat fin 33g may be basically formed to surround the sensible heat exchange pipe 32g. The sensible heat fin 33g may surround areas corresponding to a predetermined width from the peripheries of upstream-side end portions of the sensible heat exchange pipe 32g with respect to the flow direction of the combustion gas such that the areas are distinguished from the remaining areas of the sensible heat exchange pipe 32g. Accordingly, a valley may be formed in the sensible heat fin 33g along the flow direction of the combustion gas so as to be located between the adjacent upstream-side end portions of the sensible heat exchange pipe 32g. The areas of the sensible heat fin 33g that are adjacent to the upstream-side end portions of the sensible heat exchange pipe 32g relatively protrude to form the ridges. Unnecessary areas are open by forming the valleys, and thus the combustion gas may more freely flow between the sensible heat fin 33g and the sensible heat exchange pipe 32g.

Latent Heat Exchanger 40g

The latent heat exchanger 40g may be disposed downstream of the sensible heat exchanger 30g with respect to the flow direction of the combustion gas. The latent heat exchanger 40g receives latent heat generated during a phase change of the combustion gas and heats the heating-water using the latent heat. Accordingly, the combustion gas passing through the sensible heat exchanger 30g is delivered to the latent heat exchanger 40g, and the heating-water flows in the latent heat exchanger 40g and indirectly exchanges heat with the combustion gas.

Similarly to the sensible heat exchanger 30g, the latent heat exchanger 40g may include a latent heat exchange pipe through which the heating-water flows and around which the combustion gas flows. The latent heat exchange pipe may transfer the latent heat generated by the phase change of the combustion gas to the heating-water. The latent heat exchanger 40g may include the latent heat exchanger case into which opposite ends of the latent heat exchange pipe are inserted. The latent heat exchange pipe may be formed to be similar to the sensible heat exchange pipe 32g, and the latent heat exchanger case may be formed to be similar to the sensible heat exchanger case. Therefore, exceptional characteristics will be described below, but the overall description is replaced with the description of the sensible heat exchanger 30g. However, around the latent heat exchange pipe, a phenomenon may arise in which condensate is generated by the phase change of the combustion gas and falls onto the condensate receiver 55g by the force of gravity.

Likewise to the sensible heat exchanger 30g, the latent heat exchanger 40g may be of a fin-tube type. A latent heat fin is formed in a plate shape perpendicular to the predetermined direction in which the latent heat exchange pipe extends, and the latent heat exchange pipe passes through the latent heat fin. The latent heat fin may increase the surface area of the latent heat exchange pipe through which the latent heat is received, thereby enabling a larger amount of latent heat to be transferred to the heating-water.

The latent heat fin may include a plurality of latent heat fins. The latent heat fins may be spaced apart from each other at predetermined intervals along the predetermined direction in which the latent heat exchange pipe extends. The intervals at which the latent heat fins are spaced apart from each other may be intervals by which condensate formed between the adjacent latent heat fins is easily discharged. The intervals by which the condensate is easily discharged refer to intervals between the latent heat fins in a state in which the weight of the condensate formed between the latent heat fins is greater than the vertical resultant force of tensions acting between the latent heat fins and the condensate. The height of the condensate formed between the latent heat fins is inversely proportional to the minimum interval between the latent heat fins by which the condensate is easily discharged. Therefore, the intervals by which the condensate is easily discharged may be determined by selecting an appropriate height of the condensate desired to be discharged from the latent heat exchanger 40g.

The number of latent heat fins may be smaller than the number of sensible heat fins 33g. Accordingly, the intervals at which the adjacent latent heat fins are spaced apart from each other may be greater than or equal to the intervals at which the adjacent sensible heat fins 33g are spaced apart from each other.

The cross-sectional area of an interior space of the latent heat exchange pipe obtained by cutting the latent heat exchange pipe with a plane perpendicular to the direction in which the latent heat exchange pipe extends may be smaller than the cross-sectional area of the interior space of the sensible heat exchange pipe 32g obtained by cutting the sensible heat exchange pipe 32g with the plane perpendicular to the direction in which the sensible heat exchange pipe 32g extends. The latent heat exchange pipe may extend in the predetermined direction. The latent heat exchange pipe may have a smaller size than the sensible heat exchange pipe 32g such that in the same volume, the latent heat exchange pipe has a wider surface area than the sensible heat exchange pipe 32g. As the surface area of the latent heat exchange pipe is increased, a larger amount of heat may be exchanged between the heating-water flowing through the latent heat exchange pipe and the condensate.

The cross-section of the latent heat exchange pipe obtained by cutting the latent heat exchange pipe with the plane perpendicular to the predetermined direction may have the shape of a long narrow hole, similarly to the cross-section of the sensible heat exchange pipe 32g.

In an embodiment of the present disclosure, the latent heat exchanger 40g is illustrated as having no means for thermal insulation. However, in various modified examples, the latent heat exchanger 40g may have latent heat insulation pipes (not illustrated) that are disposed in the same manner as the sensible heat insulation pipes 34g. The latent heat insulation pipes may be disposed adjacent to the latent heat exchanger case, and the heating-water may flow through the latent heat insulation pipes to thermally insulate the latent heat exchanger 40g.

One or more layers in which latent heat fins located in the same position with respect to the reference direction are disposed may be formed. The total number of latent heat fins disposed in the layer most adjacent to the sensible heat fins 33g among the layers may be smaller than the total number of sensible heat fins 33g.

Flow Passage Cap Plates 361g and 362g

The heat exchanger unit may include the plurality of flow passage cap plates 361g and 362g including a plurality of flow passage caps that connect the sensible heat insulation pipes 34g and end portions of the sensible heat exchange pipe 32g that are adjacent to the sensible heat insulation pipes 34g, or connect straight portions adjacent to each other among the plurality of straight portions. The flow passage cap plates 361g and 362g may include the flow passage caps 3621g and may connect the straight portions, which are spaced apart from each other, to form a flow passage through which the heating-water flows in the sensible heat exchanger 30g.

Specifically, the opposite ends of each of the straight portions included in the sensible heat exchange pipe 32g and the opposite ends of each of the sensible heat insulation pipes 34g are inserted into the general sensible heat side plates of the sensible heat exchanger case, but the ends of the straight portions and the sensible heat insulation pipes 34g are in an open state without being closed. The straight portions included in the sensible heat exchange pipe 32g and the sensible heat insulation pipes 34g extend from one of the general sensible heat side plates to the other, and the ends of the straight portions and the sensible heat insulation pipes 34g are exposed outside the general sensible heat side plates. The flow passage cap plates 361g and 362g are coupled to the general sensible heat side plates while covering the general sensible heat side plates from the outside. Accordingly, the flow passage caps of the flow passage cap plates 361g and 362g, together with the general sensible heat side plates, form connection spaces that surround the ends of the straight portions and the ends of the sensible heat insulation pipes 34g.

The flow passage caps included in the flow passage cap plates 361g and 362g form the empty connection spaces, in which fluid is able to flow, between the general sensible heat side plates and the insides of the flow passage caps. The flow passage caps 3621g having the connection spaces inside may connect two straight portions adjacent to each other among the plurality of straight portions inserted into the general sensible heat side plates, or may connect the sensible heat insulation pipes 34g and straight portions adjacent to the sensible heat insulation pipes 34g. The flow passage cap plates 361g and 362g may be coupled to the general sensible heat side plates through brazing welding, or may be fit into the general sensible heat side plates. However, the coupling method is not limited thereto.

The number of straight portions or sensible heat insulation pipes 34g simultaneously connected by the flow passage caps 3621 is not limited to the contents illustrated in the drawings. Accordingly, the number of flow passage caps 3621g included in one flow passage cap plate 361g or 362g is also not limited to the content illustrated, and a modification can be made to the number of flow passage caps 3621g.

The flow passage caps 3621g may form a series flow passage in which an inlet of one pipe and an outlet of another pipe are connected, or may form a parallel flow passage in which connected pipes have a common inlet and a common outlet. Here, an inlet refers to an opening at one end of a pipe through which the heating-water is introduced into the pipe, and an outlet refers to an opening at an opposite end of the pipe through which the heating-water is released from the pipe. The pipes include the straight portions and the first and second sensible heat insulation pipes 341g and 342g. In a case where a series flow passage is formed by using the pipes, the heating-water may flow fast, and thus acoustic boiling noise generated by heating-water that flows at low speed and overheats may be reduced. In a case where a parallel flow passage is at least partially included in the series flow passage, the load of a pump forcibly delivering the heating-water may be decreased.

The sensible heat exchanger 30g and the latent heat exchanger 40g may be separately configured and may have the sensible heat exchanger case and the latent heat exchanger case, respectively. However, as illustrated, the sensible heat exchanger 30g and the latent heat exchanger 40g may be integrally formed with each other to configure a heat exchanger 50g for a condensing boiler.

Likewise, the sensible heat exchanger case and the latent heat exchanger case may be separate from each other. However, as illustrated in the drawings, the sensible heat exchanger case and the latent heat exchanger case may be integrally formed with each other. In this case, a main case 51g may include both the sensible heat exchanger case and the latent heat exchanger case and may be formed in an integrated form. The sensible heat insulation side plates of the sensible heat exchanger 30g and latent heat insulation side plates of the latent heat exchanger 40g may integrally form main heat insulation side plates 512g, and the general sensible heat side plates of the sensible heat exchanger 30g and general latent heat side plates of the latent heat exchanger 40g may integrally form main general side plates 511g.

A latent heat flow passage that is connected to the sensible heat flow passage and through which the heating-water flows is formed by the latent heat exchange pipe, and the sensible heat flow passage through which the heating-water flows is formed by the sensible heat exchange pipe 32g and the sensible heat insulation pipes 34g. The sensible heat flow passage and the latent heat flow passage are connected to form an integrated heating-water flow passage. The sensible heat flow passage may include a series flow passage in at least a partial section thereof, and the latent heat flow passage may include a parallel flow passage in at least a partial section thereof.

In an embodiment of the present disclosure, the flow passage cap plates 361g and 362g connecting the sensible heat exchanger 30g and the latent heat exchanger 40g may be disposed to form the heating-water flow passage without connection by a separate tube.

To connect openings of the latent heat exchange pipe, the sensible heat exchange pipe 32g, and the sensible heat insulation pipes 34g that are exposed outside the two main general side plates 511g of the main case 51g, the flow passage cap plates 361g and 362g include the flow passage caps 3621g that form connection spaces surrounding the openings between the main general side plates 511g and the flow passage caps 3621g.

To connect an outlet of the latent heat flow passage that is exposed outside a reference side plate, which is one of the two main general side plates 511g, and is formed by the latent heat exchange pipe and an inlet of the sensible heat flow passage that is exposed outside the reference side plate and through which the heating-water is introduced into the sensible heat insulation pipes 34g, one of the flow passage cap plates 361g and 362g that is located on one side along the predetermined direction includes a flow passage cap that forms, between the reference side plate and the flow passage cap, a connection space surrounding the outlet of the latent heat flow passage and the inlet of the sensible heat flow passage.

Shape of Heat Exchange Area

The cross-sectional area of the heat exchange area defined on a plane perpendicular to the reference direction is referred to as a reference cross-sectional area. The main case 51g may be provided such that the reference cross-sectional area of the most downstream side is smaller than the reference cross-sectional area of the most upstream side with respect to the reference direction. The main case 51g may be provided such that at least one section in which the reference cross-sectional area of the heat exchange area gradually decreases along the reference direction is formed to allow the combustion gas to flow at higher speed in a latent heat exchange area than in a sensible heat exchange area.

The sensible heat exchange area is an area that is located downstream of the combustion chamber 20g with respect to the reference direction and that receives the sensible heat generated at the upstream side and heats the heating-water. The sensible heat exchange area may be connected with an interior space of the combustion chamber 20g. The combustion gas may flow in the sensible heat exchange area, and the sensible heat exchange area may receive radiant heat from the burner. Furthermore, in the sensible heat exchange area, the sensible heat has to be able to be transferred to the heating-water. Accordingly, the sensible heat exchange pipe 32g and the sensible heat fins 33g may be disposed in the sensible heat exchange area.

The latent heat exchange area is an area that is located downstream of the sensible heat exchange area with respect to the reference direction and that receives the latent heat generated during the phase change of the combustion gas and heats the heating-water. The latent heat exchange pipe through which the heating-water flows and around which the combustion gas flows and the latent heat fins that are formed in a plate shape and through which the latent heat exchange pie passes may be disposed in the latent heat exchange area.

The heat exchange area may be formed to include at least one section in which the reference cross-sectional area gradually decreases along the reference direction. Accordingly, the heat exchange area may have a tapered shape along the reference direction as a whole. As the heat exchange area is formed such that the reference cross-sectional area decreases, the occurrence of a dead zone where heat transfer efficiency is deteriorated due to a sharp reduction in flow speed at a specific position when the combustion gas flows in the latent heat exchange area may be prevented by Bernoulli's principle. In particular, in a case where the latent heat exchange pipe is formed in two or more layers as in an embodiment of the present disclosure, the condensate may block a space between the latent heat fins, or the length of the latent heat exchange area along the reference direction may become longer, and therefore thermal efficiency may be deteriorated. However, the problem may be overcome because the heat exchange area has a tapered shape as described above. Specifically, the heat exchange area may be formed to include at least one section in which the width of the heat exchange area in the orthogonal direction decreases along the reference direction and may be formed such that the width of the heat exchange area in the predetermined direction remains constant along the reference direction. That is, the reference cross-sectional area is decreased by reducing only the width in the orthogonal direction in a state in which the width in the predetermined direction remains constant along the reference direction. To form the above-described shape, the general side plates 511g may be formed in a general plate shape, and the heat insulation side plates 512g may be formed to be bent as illustrated.

The shape of the heat exchange area may be described, with the most upstream side of each fin with respect to the reference direction referred to as an inlet end and the most downstream side referred to as an outlet end. The heat exchange area may be provided such that the reference cross-sectional area gradually decreases along the reference direction from outlet ends of the sensible heat fins 33g toward inlet ends of the latent heat fins. That is, a section from the points where the outlet ends of the sensible heat fins 33g are located to the points where the inlet ends of the latent heat fins are located may have a gradually decreasing cross-sectional area along the reference direction.

The reference cross-sectional area of a partial section of the sensible heat exchange area may gradually decrease along the reference direction.

As the width of the heat exchange area is changed as described above, each fin may have a section in which the width in the orthogonal direction decreases along the reference direction.

The sensible heat fins 33g or the latent heat fins located in the heat exchange area may be provided such that the widths gradually decrease along the reference direction to correspond to the gradual reduction in the reference cross-sectional area, based on the widths of the fins defined in the direction perpendicular to the reference direction.

Combustion Chamber 20g

The combustion chamber 20g includes an interior space 22g in which a flame generated by a combustion reaction in the burner assembly 10g is located. The combustion chamber 20g is formed by surrounding the interior space 22g with sidewalls. The burner assembly 10g and the combustion chamber 20g are coupled such that the burner of the burner assembly 10g is located upstream of the interior space 22g with respect to the flow direction of the combustion gas.

The burner assembly 10g causes a combustion reaction by applying heat to air and fuel. A flame and a combustion gas accompanied by thermal energy are generated as products of the combustion reaction. The flame is located in the interior space 22g of the combustion chamber 20g, but extends from the burner assembly 10g along the flow direction of the combustion gas. The combustion gas flows through the interior space 22g. The interior space 22g of the combustion chamber 20g may be connected in a direction parallel to the flow direction of the combustion gas. In an embodiment of the present disclosure, the flow direction of the combustion gas is a vertically downward direction, and therefore the interior space 22g of the combustion chamber 20g is connected in the vertical direction.

In a case where a combustion chamber heat insulation part is disposed to thermally insulate the combustion chamber 20g with a heat insulating material, the workability of the heat insulating material may be deteriorated by dust, and there is a risk of separation of the heat insulating material.

The combustion chamber 20g of the heat exchanger unit according to an embodiment of the present disclosure may include a combustion chamber heat insulation pipe 24g instead of the combustion chamber heat insulation part that performs thermal insulation using the heat insulating material. The combustion chamber heat insulation pipe 24g is disposed adjacent to the combustion chamber 20g. To thermally insulate the combustion chamber 20g, the combustion chamber heat insulation pipe 24g receives the heating-water and allows the heating-water to flow therethrough. In an embodiment of the present disclosure, improved thermal insulation performance may be achieved by using the combustion chamber heat insulation pipe 24g that is able to be semi-permanently used, compared to a heat insulating material for thermal insulation of the combustion chamber 20g.

In an embodiment, the combustion chamber heat insulation pipe 24g and the sensible heat insulation pipes 34g may have a circular cross-section. However, as described in the other embodiments, pipes having an oval shape may be used as the insulation pipes.

As illustrated in FIG. 4, the sensible heat insulation pipes 34g may include the first sensible heat insulation pipe 341g disposed adjacent to the left side of the sensible heat exchanger 30g and the second sensible heat insulation pipe 342g disposed adjacent to the right side of the sensible heat exchanger 30g. However, the number and positions of sensible heat insulation pipes 34g are not limited thereto.

The combustion chamber heat insulation pipe 24g may include a plurality of combustion chamber heat insulation pipes 241g, 242g, 243g, and 244g. As illustrated in FIG. 4, the plurality of combustion chamber heat insulation pipes 241g, 242g, 243g, and 244g may be disposed adjacent to the left and right sides of the combustion chamber 20g and may be vertically spaced apart from each other. A total of four combustion chamber heat insulation pipes 24g are disposed. Among them, two combustion chamber heat insulation pipes are disposed adjacent to the left side of the combustion chamber 20g and vertically spaced apart from each other, and the remaining two combustion chamber heat insulation pipes are disposed adjacent to the right side of the combustion chamber 20g and vertically spaced apart from each other.

The two combustion chamber heat insulation pipes 24g disposed on the left side of the combustion chamber 20g may be referred to as the first combustion chamber heat insulation pipe 241g and the third combustion chamber heat insulation pipe 243g in sequence from bottom to top, and the two combustion chamber heat insulation pipes 24g disposed on the right side of the combustion chamber 20g may be referred to as the second combustion chamber heat insulation pipe 242g and the fourth combustion chamber heat insulation pipe 244g in sequence from bottom to top. However, the arrangement and number of combustion chamber heat insulation pipes 24g are not limited thereto.

Lower ends of the combustion chamber heat insulation pipes 24g located in the lowermost positions among the combustion chamber heat insulation pipes 24g may be located above upper ends of the sensible heat fins 33g included in the sensible heat exchanger 30g. The distance H1 from a lower end of the burner assembly 10g to the upper ends of the sensible heat fins 33g may range from 80 mm to 85 mm. Through the configuration described above, a quenching phenomenon of carbon monoxide may be reduced.

The quenching phenomenon of carbon monoxide refers to a phenomenon in which carbon monoxide generated through combustion is released without change while making contact with the sensible heat exchanger 30g at a relatively low temperature without being changed to carbon dioxide by combining with oxygen in a high-temperature area in the combustion chamber 20g.

The combustion chamber 20g may include a combustion chamber case 21g. The combustion chamber case 21g surrounds the interior space 22g in which the flame generated by the burner assembly 10g is located. The combustion chamber case 21g may include two general combustion chamber side plate portions disposed to be spaced apart from each other in a fore/aft direction and two combustion chamber heat insulation side plate portions that are disposed to be spaced apart from each other in a left/right direction and that form the interior space 22g of the combustion chamber 20g together with the two general combustion chamber side plate portions. The combustion chamber case 21g may be formed in a rectangular parallelepiped shape that is open in an up/down direction. However, the shape of the combustion chamber case 21g is not limited thereto.

The general combustion chamber side plate portions and the combustion chamber heat insulation side plate portions may be general combustion chamber side plates 211g and combustion chamber heat insulation side plates 212g that are separate from each other, or may be partial areas of a side plate of the combustion chamber case 21g. In this disclosure, it will be exemplified that the general combustion chamber side plate portions and the combustion chamber heat insulation side plate portions are formed of the general combustion chamber side plates 211g and the combustion chamber heat insulation side plates 212g that are separate from each other.

The combustion chamber heat insulation pipes 24g may make contact with the outsides of the combustion chamber heat insulation side plates 212g to thermally insulate the combustion chamber 20g. The heating-water may flow through the combustion chamber heat insulation pipes 24g to reduce the amount by which heat generated by the combustion reaction is transferred outside the combustion chamber 20g through the combustion chamber case 21g.

Portions of the combustion chamber heat insulation side plates 212g with which the combustion chamber heat insulation pipes 24g make contact may have an inwardly concave shape to correspond to the exteriors of the combustion chamber heat insulation pipes 24g. Accordingly, in this case, the outsides of the combustion chamber heat insulation pipes 24g may make contact with the combustion chamber heat insulation side plates 212g over a wider area, as compared with when the combustion chamber heat insulation side plates 212g are formed in a simple flat plate shape.

The combustion chamber 20g may include combustion chamber flow passage cap plates 251g and 252g disposed outward of the general combustion chamber side plates 211g. The combustion chamber flow passage cap plates 251g and 252g may include the first combustion chamber flow passage cap plate 251g located at the rear and the second combustion chamber flow passage cap plate 252g located at the front. Combustion chamber flow passage caps 2511g, 2512g, 2521g, and 2522g included in the combustion chamber flow passage cap plates 251g and 252g may form connection spaces between the general combustion chamber side plates 211g and the combustion chamber flow passage caps 2511g, 2512g, 2521g, and 2522g. Other portions of the combustion chamber flow passage cap plates 251g and 252g rather than the combustion chamber flow passage caps 2511g, 2512g, 2521g, and 2522g may be coupled or brought into contact with the general combustion chamber side plates 211g. However, the combustion chamber flow passage caps 2511g, 2512g, 2521g, and 2522g may be spaced apart from the general combustion chamber side plates 211g to form the connection spaces in which the heating-water is accommodated.

To connect the combustion chamber heat insulation pipes 24g, the connection spaces surround openings formed in end portions of the combustion chamber heat insulation pipes 24g. Accordingly, the combustion chamber heat insulation pipes 24g may be fluidically connected by the connection spaces, and a combustion chamber flow passage through which the heating-water flows may be foiled by the combustion chamber heat insulation pipes 24g and the connection spaces. The combustion chamber flow passage may be a passage through which the heating-water introduced through a combustion chamber supply hole 261g that is an inlet flows by the combustion chamber heat insulation pipes 24g and the connection spaces until the heating-water is released through a combustion chamber discharge hole 262g that is an outlet.

A connecting adaptor 61g included in the heat exchanger unit may connect the sensible heat flow passage, which is formed by the sensible heat exchange pipe 32g and the flow passage caps of the sensible heat exchanger 30g, and the combustion chamber flow passage, which is formed by the combustion chamber heat insulation pipes 24g. As illustrated, the connecting adaptor 61g may be located at the front and may be obliquely disposed in the left/right direction with respect to the up/down direction to connect a heating-water discharge hole 372g formed in the second flow passage cap plate 362g having a heating-water supply hole 371g formed therein and the combustion chamber supply hole 261g formed in the combustion chamber flow passage cap plate 252g. The first flow passage cap plate 361g may be disposed at the rear.

Figure 6:
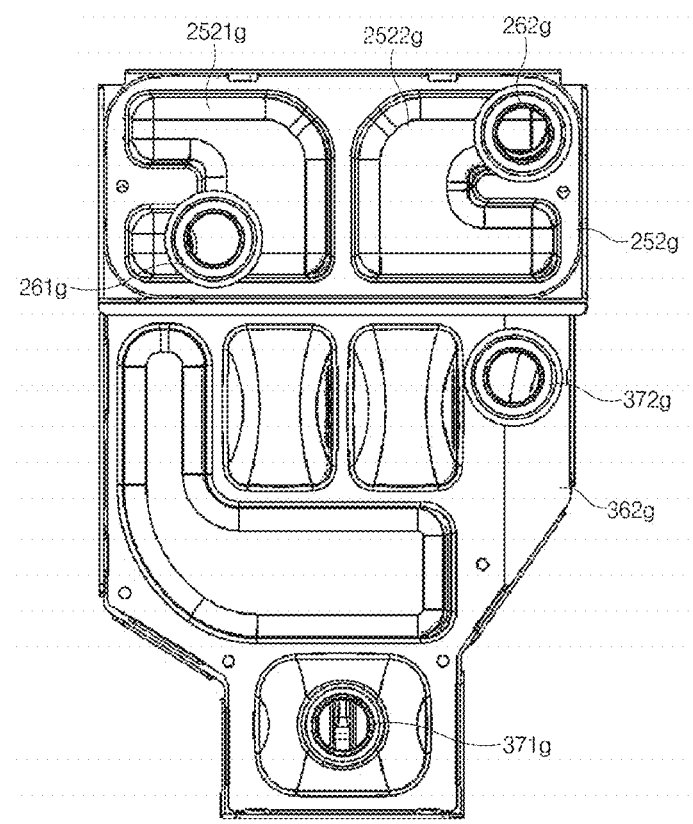
FIG. 6 is a view illustrating a state in which a connecting adaptor is removed from the front of the heat exchanger unit according to an embodiment of the present disclosure.
Figure 7:
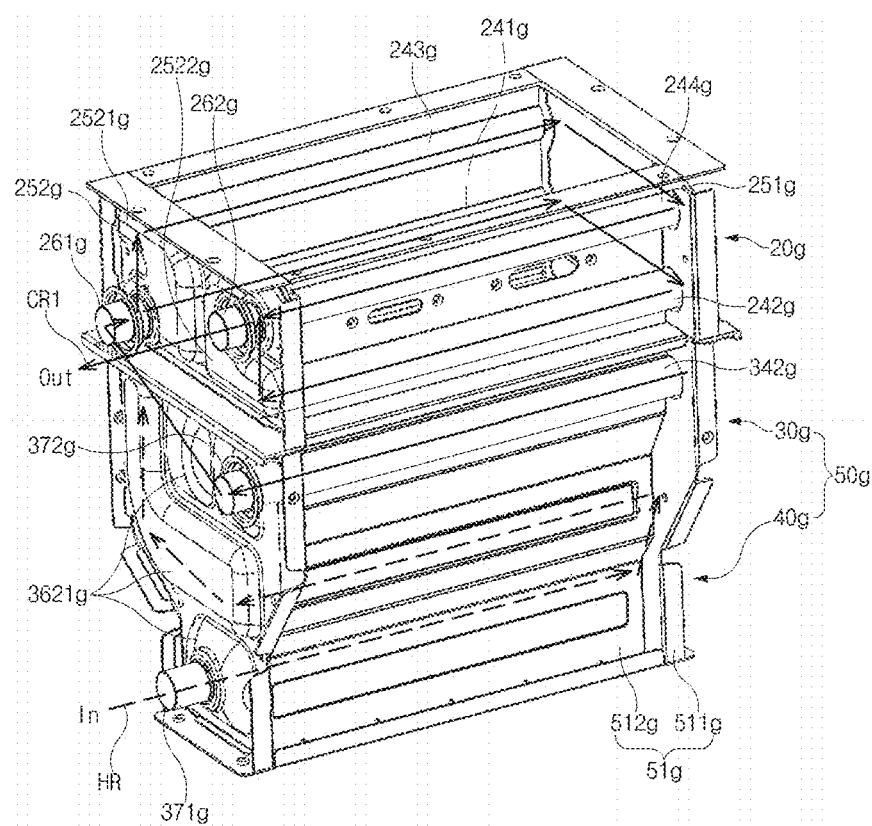
FIG. 7 is a view illustrating an overall flow passage of the heat exchanger unit according to an embodiment of the present disclosure.

FIG. 6 is a view illustrating a state in which the connecting adaptor 61g is removed from the front of the heat exchanger unit according to an embodiment of the present disclosure. FIG. 7 is a view illustrating an overall flow passage of the heat exchanger unit according to an embodiment of the present disclosure.

A combustion chamber flow passage CR1 according to an embodiment of the present disclosure will be described below with additional reference to FIGS. 6 and 7. According to an embodiment of the present disclosure, the combustion chamber flow passage CR1 may be formed in parallel. The combustion chamber heat insulation pipes 241g and 243g disposed on the left side of the combustion chamber 20g and connected with a heat exchanger flow passage HR to receive the heating-water may have a common inlet. The heating-water may be introduced into the first combustion chamber flow passage cap 2521g having the combustion chamber supply hole 261g formed therein, and the combustion chamber heat insulation pipes 241g and 243g disposed on the left side of the combustion chamber 20g may be fluidically connected to the first combustion chamber flow passage cap 2521g. Accordingly, the combustion chamber heat insulation pipes 241g and 243g disposed on the left side of the combustion chamber 20g may have the common inlet, and the heating-water may flow through the first combustion chamber heat insulation pipe 241g and the third combustion chamber heat insulation pipe 243g.

The heating-water flowing through the first combustion chamber heat insulation pipe 241g reaches the second combustion chamber flow passage cap 2511g, and the heating-water flowing through the third combustion chamber heat insulation pipe 243g reaches the third combustion chamber flow passage cap 2512g. In the first combustion chamber flow passage cap plate 251g, the third combustion chamber flow passage cap 2512g may be disposed above the second combustion chamber flow passage cap 2511g.

Accordingly, the first combustion chamber flow passage cap 2521g and the second combustion chamber flow passage cap 2511g may be fluidically connected with each other through the first combustion chamber heat insulation pipe 241g, and the first combustion chamber flow passage cap 2521g and the third combustion chamber flow passage cap 2512g may be fluidically connected with each other through the third combustion chamber heat insulation pipe 243g.

The second combustion chamber flow passage cap 2511g and the third combustion chamber flow passage cap 2512g may extend in the left/right direction. The second combustion chamber flow passage cap 2511g and the third combustion chamber flow passage cap 2512g may be fluidically connected with the second combustion chamber heat insulation pipe 242g and the fourth combustion chamber heat insulation pipe 244g, respectively, which are disposed on the right side of the combustion chamber 20g. The combustion chamber heat insulation pipes 242g and 244g disposed on the right side of the combustion chamber 20g may be fluidically connected with the fourth combustion chamber flow passage cap 2522g that is formed in the second combustion chamber flow passage cap plate 252g together with the first combustion chamber flow passage cap 2521g and that has the combustion chamber discharge hole 262g formed therein. Accordingly, the combustion chamber heat insulation pipes 242g and 244g disposed on the right side of the combustion chamber 20g may have a common outlet, and the combustion chamber flow passage CR1 in which the combustion chamber heat insulation pipes 24g are fluidically connected in parallel may be formed. The structure of the combustion chamber 20g having the parallel flow passage may be appropriately used in the condensing boiler 3.

Figure 8:
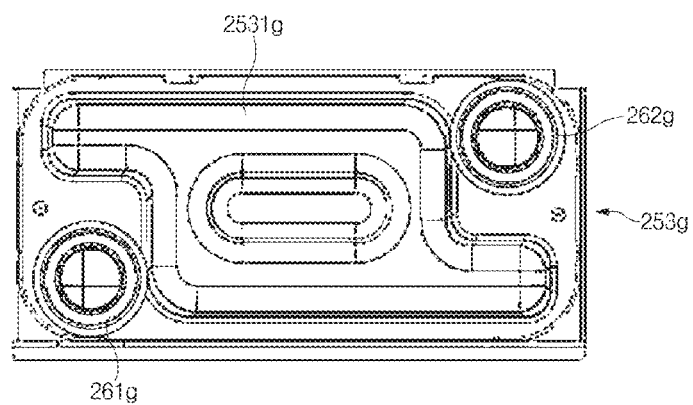
FIG. 8 is a view illustrating a state in which the connecting adaptor is removed from the front of a combustion chamber according to a first modified example of the embodiment of the present disclosure.
Figure 9:
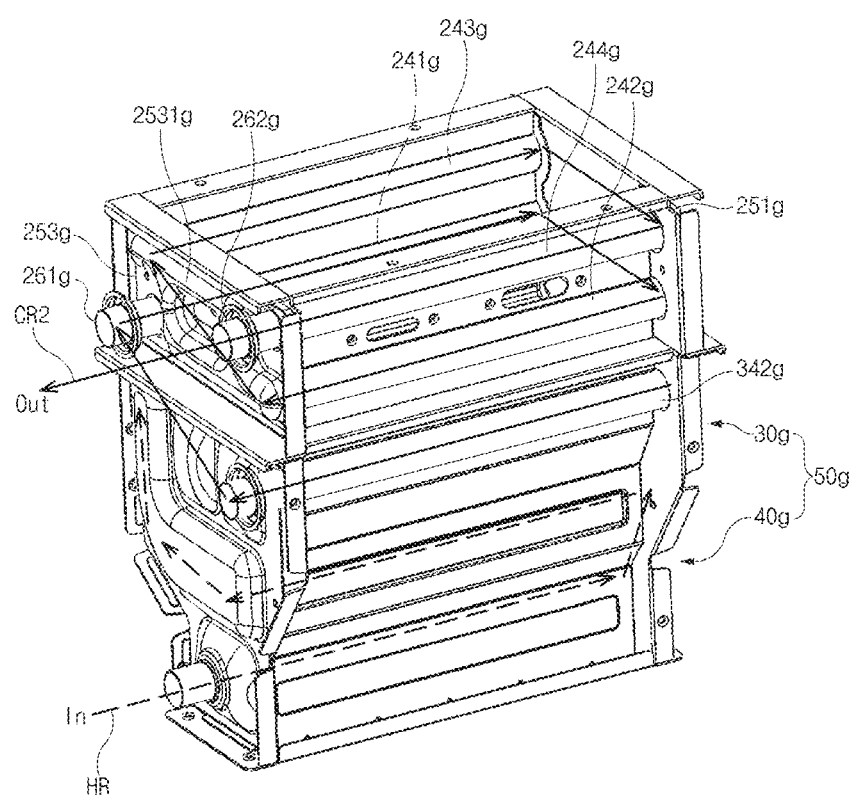
FIG. 9 is a view illustrating an overall flow passage of a heat exchanger unit according to the first modified example of the embodiment of the present disclosure.

FIG. 8 is a view illustrating a state in which the connecting adaptor 61g is removed from the front of the combustion chamber 20g according to a first modified example of the embodiment of the present disclosure. FIG. 9 is a view illustrating an overall flow passage of a heat exchanger unit according to the first modified example of the embodiment of the present disclosure.

A combustion chamber flow passage CR2 formed by a third combustion chamber flow passage cap plate 253g according to the first modified example of the embodiment of the present disclosure will be described below with additional reference to FIGS. 8 and 9. According to the first modified example of the embodiment of the present disclosure, the combustion chamber flow passage CR2 that is connected with the heat exchanger flow passage HR and that receives the heating-water may be formed in series by the third combustion chamber flow passage cap plate 253g instead of the second combustion chamber flow passage cap plate 252g.

The first combustion chamber heat insulation pipe 241g may be connected with the combustion chamber supply hole 261g, the first combustion chamber heat insulation pipe 241g may be connected with the second combustion chamber heat insulation pipe 242g through the second combustion chamber flow passage cap 2511g, the second combustion chamber heat insulation pipe 242g may be connected with the third combustion chamber heat insulation pipe 243g by a first combustion chamber flow passage cap 2531g formed in the third combustion chamber flow passage cap plate 253g, the third combustion chamber heat insulation pipe 243g may be connected with the fourth combustion chamber heat insulation pipe 244g through the third combustion chamber flow passage cap 2512g, and the heating-water may be released through the combustion chamber discharge hole 262g. Accordingly, the series combustion chamber flow passage CR2 in which the combustion chamber flow passage caps 2511g, 2512g, and 2531g and the combustion chamber heat insulation pipes 241g, 242g, 243g, and 244g are sequentially connected in series may be formed. The structure of the combustion chamber 20g having the series flow passage may be appropriately used in a water heater.

Figure 10:
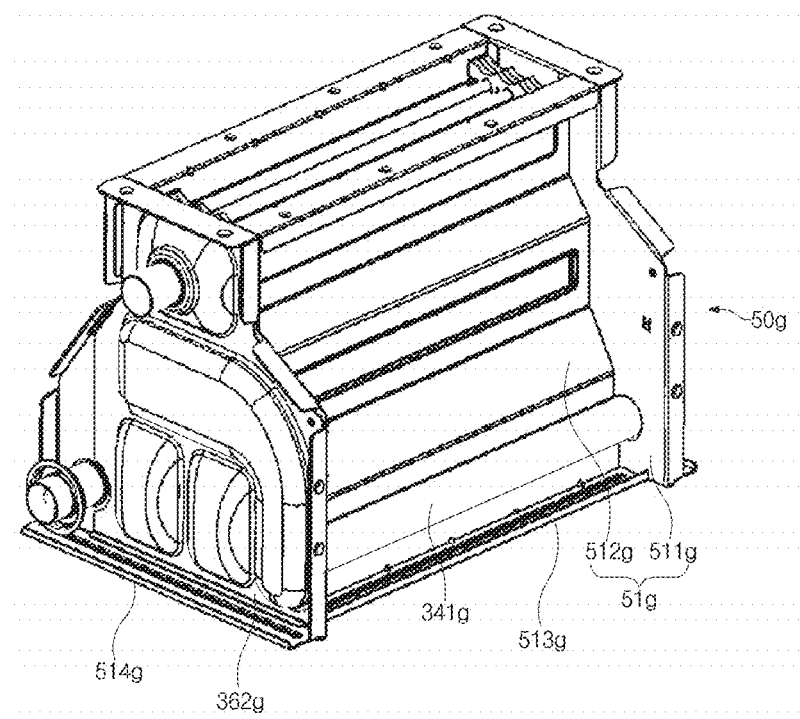
FIG. 10 is a perspective view illustrating a heat exchanger for the condensing boiler according to an embodiment of the present disclosure.

FIG. 10 is a perspective view illustrating the heat exchanger 50g for the condensing boiler according to an embodiment of the present disclosure.

The heat exchanger 50g for the condensing boiler in an embodiment of the present disclosure may be formed by assembling the above-described components. The sensible heat insulation pipes 34g, the sensible heat exchange pipe 32g, the sensible heat fins 33g, the main heat insulation side plates 512g, the main general side plates 511g, the flow passage cap plates 361g and 362g, and the like that are separate form one another may be assembled, and as illustrated in FIG. 10, the heat exchanger 50g for the condensing boiler may be disposed such that the sensible heat exchanger faces downward.

Figure 11:
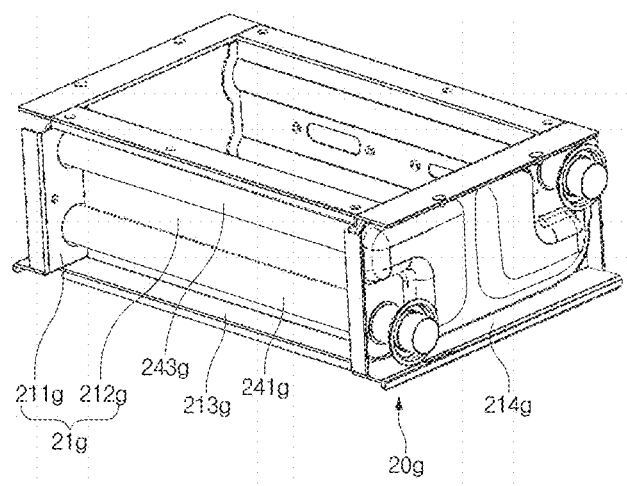
FIG. 11 is a perspective view illustrating a combustion chamber according to an embodiment of the present disclosure.

FIG. 11 is a perspective view illustrating the combustion chamber 20g according to an embodiment of the present disclosure.

The combustion chamber 20g in an embodiment of the present disclosure may be formed by assembling the above-described components. The combustion chamber 20g may be formed by assembling the combustion chamber heat insulation pipes 24g, the combustion chamber heat insulation side plates 212g, the general combustion chamber side plates 211g, the combustion chamber flow passage cap plates 251g and 252g, and the like that are separate form one another. The combustion chamber heat insulation pipes 24g may be additionally assembled. As illustrated in FIG. 11, the combustion chamber 20g may be disposed such that the combustion chamber supply hole 261g is located above the combustion chamber discharge hole 262g.

Figure 12:
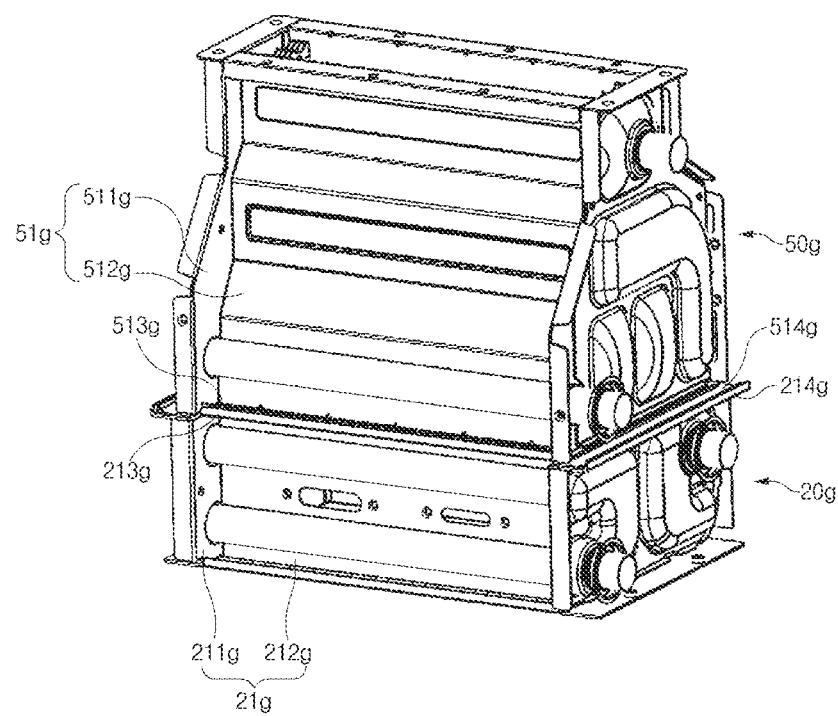
FIG. 12 is a perspective view illustrating a situation in which the heat exchanger for the condensing boiler and the combustion chamber are combined according to an embodiment of the present disclosure.

FIG. 12 is a perspective view illustrating a situation in which the heat exchanger 50g for the condensing boiler and the combustion chamber 20g are combined according to an embodiment of the present disclosure.

The heat exchanger 50g and the combustion chamber 20g may be combined with each other through mechanical elements. In this case, a defect in assembly may frequently occur, and due to a complicated assembly process, costs required for assembly may rise.

Referring to the drawings, the heat exchanger unit may be formed by seating the heat exchanger 50g for the condensing boiler of FIG. 10 on the combustion chamber 20g of FIG. 11 and combining the heat exchanger 50g and the combustion chamber 20g together. The heat exchanger 50g for the condensing boiler and the combustion chamber 20g may be combined with each other by a brazing process of performing welding by applying and heating a metallic paste for brazing. A paste may be applied to at least one of a surface of the combustion chamber 20g that is to be brought into contact with the heat exchanger 50g for the condensing boiler or a surface of the heat exchanger 50g for the condensing boiler that is to be brought into contact with the combustion chamber 20g. The heat exchanger unit may be formed by seating the heat exchanger 50g for the condensing boiler on the combustion chamber 20g. Brazing may be performed by heating the heat exchanger unit.

Even when the combustion chamber 20g and the heat exchanger 50g for the condensing boiler are assembled, components may be firmly combined by applying a paste between the components and performing brazing through heating. Due to a decrease in cost in the assembly process, the combustion chamber heat insulation pipes 24g that cost more than a heat insulating material are able to be used.

To firmly join the combustion chamber 20g and the main case 51g, a structure for sufficiently ensuring a contact surface may be formed on the combustion chamber 20g and the heat exchanger 50g for the condensing boiler. The combustion chamber 20g may include combustion chamber flanges 213g, and the sensible heat exchanger 30g may include heat exchanger flanges 513g that make contact with the combustion chamber flanges 213g. A paste may be applied between the heat exchanger flanges 513g and the combustion chamber flanges 213g, and the heat exchanger flanges 513g and the combustion chamber flanges 213g may be brought into contact with each other as illustrated in FIG. 12. Thereafter, the heat exchanger 50g and the combustion chamber 20g may be placed in a furnace and may be heated. Accordingly, the paste may be melted and may be permeated between the two members by a wetting phenomenon and a capillary action to join the heat exchanger flanges 513g and the combustion chamber flanges 213g.

Figure 13:
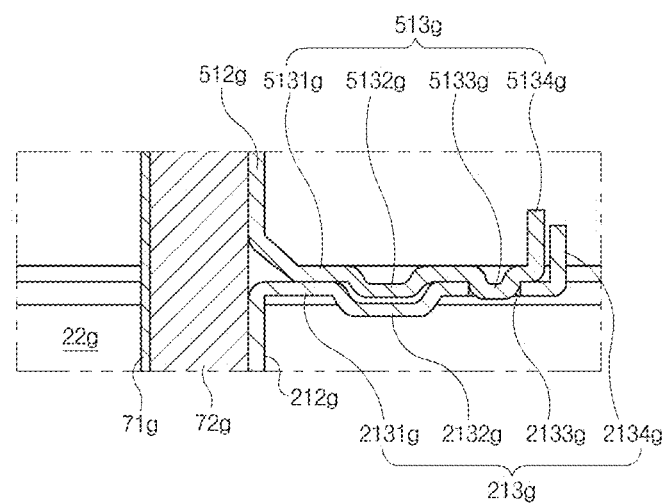
FIG. 13 is an inverted enlarged view illustrating a portion where a combustion chamber flange and a heat exchanger flange are located in a section of the heat exchanger unit according to an embodiment of the present disclosure.

FIG. 13 is an inverted enlarged view illustrating a portion where the combustion chamber flange 213g and the heat exchanger flange 513g are located in a section of the heat exchanger unit according to an embodiment of the present disclosure.

The combustion chamber flanges 213g may protrude outward from lower ends of the combustion chamber case 21g. The heat exchanger flanges 513g may protrude outward from upper ends of the sensible heat exchanger case and may be combined with the combustion chamber flanges 213g. Accordingly, the combustion chamber 20g and the sensible heat exchanger 30g may be combined by brazing.

The combustion chamber flanges 213g may be disposed on the left and right sides of the combustion chamber case 21g and may extend from the combustion chamber heat insulation side plates 212g, and the combustion chamber 20g may further include front and rear combustion chamber flanges 214g that are disposed on the front and rear sides of the combustion chamber case 21g and that extend from the general combustion chamber side plates 211g. The sensible heat exchanger 30g may include the heat exchanger flanges 513g that are disposed on the left and right sides of the sensible heat exchanger case and that extend from the main heat insulation side plates 512g and front and rear heat exchanger flanges 514g that are disposed on the front and rear sides of the sensible heat exchanger case and that extend from the main general side plates 511g.

The combustion chamber flanges 213g and the heat exchanger flanges 513g may be combined with each other. The front and rear combustion chamber flanges 214g and the front and rear heat exchanger flanges 514g may be combined with each other. However, descriptions of the combustion chamber flanges 213g and the heat exchanger flanges 513g may be identically applied to the front and rear combustion chamber flanges 214g and the front and rear heat exchanger flanges 514g.

Figure 14:
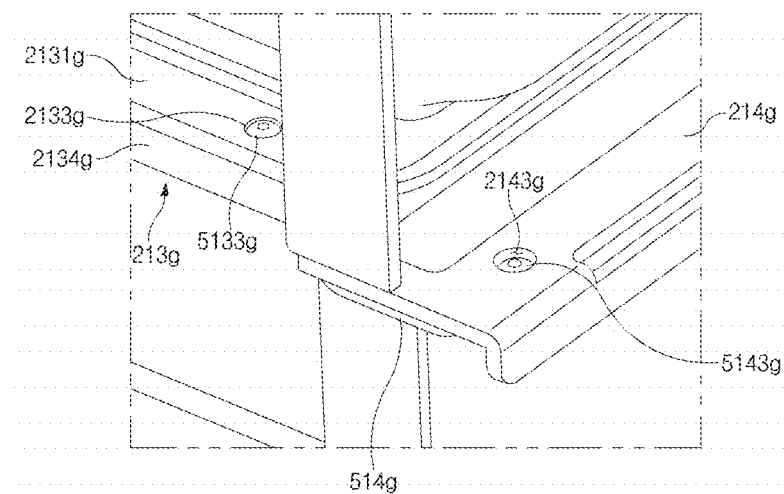
FIG. 14 is a view illustrating a portion where the combustion chamber flange and the heat exchanger flange of the heat exchanger unit are located according to an embodiment of the present disclosure.

FIG. 14 is a view illustrating a portion where the combustion chamber flange 213g and the heat exchanger flange 513g of the heat exchanger unit are located according to an embodiment of the present disclosure.

A flange protrusion 5133g and a flange opening 2133g will be described below with additional reference to FIG. 14. The combustion chamber flange 213g may include a first coupling part, and the heat exchanger flange 513g may include a second coupling part that is disposed in a position corresponding to the position of the first coupling part and with which the first coupling part is combined. One of the first coupling part and the second coupling part may be the flange protrusion 5133g protruding from the corresponding flange, and the other may be the flange opening 2133g into which the flange protrusion 5133g is fixedly inserted. In an embodiment of the present disclosure, it will be exemplified that the flange protrusion 5133g is formed as the second coupling part and the flange opening 2133g is formed as the first coupling part. However, the configuration is not limited thereto.

The flange protrusion 5133g may be inserted into the flange opening 2133g to guide mounting of the main case 51g on the combustion chamber 20g. When the main case 51g is seated on the combustion chamber 20g without the flange opening 2133g and the flange protrusion 5133g, the main case 51g may be incorrectly positioned on the combustion chamber 20g in an incorrect arrangement, which leads to a defect in assembly. However, the flange opening 2133g and the flange protrusion 5133g formed in positions corresponding to each other may allow the main case 51g to be correctly seated on the combustion chamber 20g in a correct arrangement.

The heat exchanger flange 513g may include a heat exchanger flange body 5131g extending outward from a portion of the main case 51g corresponding to the heat exchanger case. A heat exchanger flange bending portion 5134g and a heat exchanger flange embossing 5132g may protrude from the heat exchanger flange body 5131g. The heat exchanger flange bending portion 5134g may extend downward from an outer end of the heat exchanger flange body 5131g. The heat exchanger flange embossing 5132g may protrude upward from the heat exchanger flange body 5131g.

The combustion chamber flange 213g may include a combustion chamber flange body 2131g extending outward from the combustion chamber case 21g. A combustion chamber flange bending portion 2134g and a combustion chamber flange embossing 2132g may protrude from the combustion chamber flange body 2131g. The combustion chamber flange bending portion 2134g may extend downward from an outer end of the combustion chamber flange body 2131g. The combustion chamber flange embossing 2132g may protrude upward from the combustion chamber flange body 2131g.

The combustion chamber flange bending portion 2134g may be disposed to surround the heat exchanger flange bending portion 5134g from the outside. Accordingly, even when the combustion chamber 20g is about to be separated from the main case 51g in the left/right or fore/aft direction, the inside of the combustion chamber flange bending portion 2134g may be stopped by the heat exchanger flange 513g so that the combustion chamber 20g is not separated from the main case 51g. In a case where the combustion chamber flange bending portion 2134g and the heat exchanger flange bending portion 5134g are brought into contact with each other or spaced apart from each other at a very small interval, the combustion chamber flange bending portion 2134g and the heat exchanger flange bending portion 5134g may allow the combustion chamber 20g and the main case 51g to be correctly positioned in a correct arrangement in a manufacturing process of the heat exchanger unit.

The combustion chamber flange embossing 2132g may be formed in a position corresponding to the position of the heat exchanger flange embossing 5132g and may be inserted into a recess formed on a lower side of the heat exchanger flange embossing 5132g. Accordingly, in the state in which the heat exchanger unit is turned upside down as illustrated in FIG. 12, the combustion chamber flange embossing 2132g and the heat exchanger flange embossing 5132g may prevent infiltration of the paste applied between the combustion chamber flange 213g and the heat exchanger flange 513g into the combustion chamber 20g and the sensible heat exchanger 30g. The paste adjacent to the embossings 2132g and 5231g may flow down by the gravity and may be located in a concave valley formed by the combustion chamber flange embossing 2132g. Accordingly, the paste may be prevented from infiltrating into the heat exchanger unit to cause a defect.

As illustrated, front and rear flange openings 2143g may be formed in the front and rear combustion chamber flanges 214g, and front and rear flange protrusions 5143g may be formed on the front and rear heat exchanger flanges 514g to perform the same action.

Figure 15:
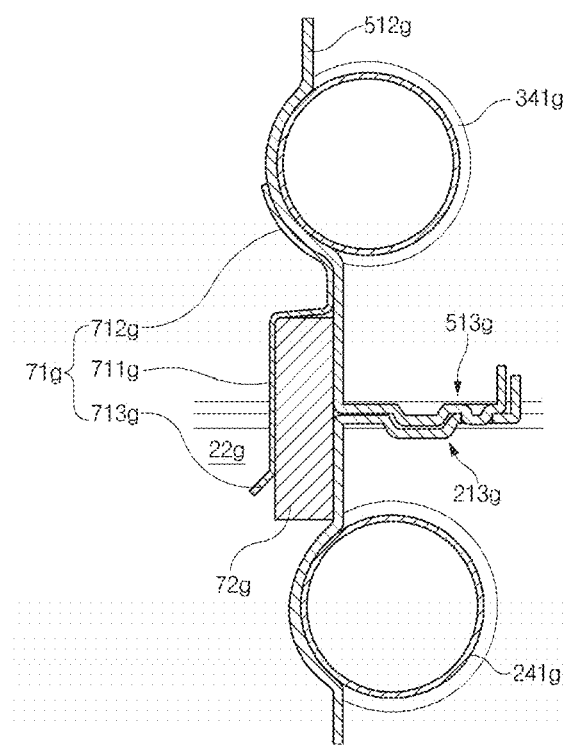
FIG. 15 is an inverted view illustrating an area where a packing bracket and a side plate packing are located in a section of the heat exchanger unit according to an embodiment of the present disclosure.

FIG. 15 is an inverted view illustrating an area where a packing bracket 71g and a side plate packing 72g are located in a section of the heat exchanger unit according to an embodiment of the present disclosure.

The side plate packing 72g and the packing bracket 71g will be described below with additional reference to FIG. 15. According to an embodiment of the present disclosure, the heat exchanger unit may further include the side plate packing 72g disposed between the sensible heat insulation pipes 34g and the combustion chamber heat insulation pipes 24g inside the heat exchanger unit. The side plate packing 72g may make contact with the inside of a portion of the main case 51g corresponding to the sensible heat exchanger case. The side plate packing 72g may further extend toward the combustion chamber 20g and may further make contact with the inside of the combustion chamber case 21g.

An area between the sensible heat insulation pipes 34g and the combustion chamber heat insulation pipes 24g may not be thermally insulated or cooled and therefore may be at risk for being overheated. In a case where the combustion chamber 20g is thermally insulated by using a heat insulating material as in other embodiments, the area that is likely to be overheated may be hidden by the heat insulating material and therefore may be at relatively low risk for being overheated. However, in a case where the area that is likely to be overheated is exposed as in an embodiment, the area may be discolored by being overheated. To prevent this problem, the side plate packing 72g may be disposed to make contact with the area that is likely to be overheated and may hamper transfer of heat to the sensible heat exchanger case.

The heat exchanger unit may further include the packing bracket 71g. The packing bracket 71g supports the side plate packing 72g such that the side plate packing 72g is sandwiched between the inside of a portion of the main case 51g corresponding to the sensible heat exchanger case and the packing bracket 71g and is brought into contact with the inside of the portion of the main case 51g corresponding to the sensible heat exchanger case.

The packing bracket 71g may include a packing bracket body 711g, a packing bracket coupling portion 712g, and a packing bracket guide 713g. The packing bracket coupling portion 712g is coupled to the inside of the main case 51g, and the packing bracket body 711g protruding inward from the packing bracket coupling portion 712g is spaced apart inward from the inside of the main case 51g to form a space into which the side plate packing 72g is inserted. The packing bracket body 711g may press the side plate packing 72g outward and may bring the side plate packing 72g into close contact with the area that is likely to be overheated. The packing bracket guide 713g may be formed to be inwardly inclined in an upward direction from one end of the packing bracket body 711g and may guide insertion of the side plate packing 72g into the space formed by the packing bracket body 711g.

The packing bracket coupling portion 712g may be connected to a lower end of the packing bracket body 711g. The packing bracket coupling portion 712g may make contact with the inside of the main case 51g, which corresponds to the sensible heat exchanger case, so as to meet the sensible heat insulation side plate 341g, with the main heat insulation side plate 512g of the main case 51g therebetween. The packing bracket coupling portion 712g making indirect contact with the sensible heat insulation pipe 341g may be cooled by the sensible heat insulation pipe 341g. Accordingly, the packing bracket 71g may help with the action of the side plate packing 72g that hampers transfer of heat to the area that is likely to be overheated.

Figure 16:
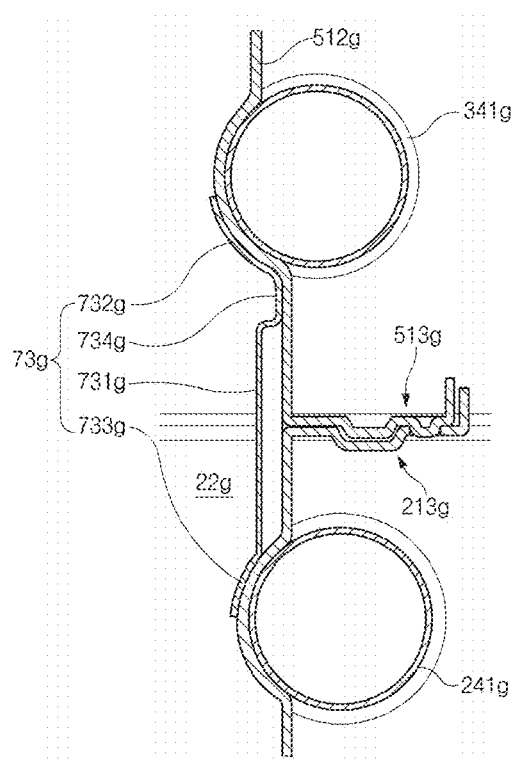
FIG. 16 is an inverted view illustrating an area where a protective bracket is located in a section of a heat exchanger unit according to a second modified example of the embodiment of the present disclosure.

FIG. 16 is an inverted view illustrating an area where a protective bracket 73g is located in a section of a heat exchanger unit according to a second modified example of the embodiment of the present disclosure.

The protective bracket 73g included in the heat exchanger unit according to the second modified example of the embodiment of the present disclosure will be described below with additional reference to FIG. 16.

The protective bracket 73g forms an air layer for thermal insulation to hamper transfer of heat to the area that is likely to be overheated. The protective bracket 73g may have, between the sensible heat insulation pipe 341g and the combustion chamber heat insulation pipe 241g, a protective bracket body 731g spaced apart inward from the inside of the main case 51g corresponding to the sensible heat exchanger case and the inside of the combustion chamber 20g and may be coupled to the inside of the main case 51g corresponding to the sensible heat exchanger case and the inside of the combustion chamber case 21g. Protective bracket 73g, packing bracket 71g and side plate packing 72g are illustrated as these components are only disposed at the left side of FIG. 4 but these components can be also disposed at the right side of FIG. 4 symmetrically.

An upper protective bracket coupling portion 733g and a lower protective bracket coupling portion 732g may be formed at upper and lower ends of the protective bracket body 731g and may be coupled with the inside of the combustion chamber case 21g and the inside of the main case 51g, respectively. Accordingly, a predetermined space may be formed by the protective bracket 73g, the inside of the main case 51g, and the inside of the combustion chamber case 21g, and air may be located in the predetermined space. An air layer may be formed by the air located in the space. The air layer may serve as a heat insulating material and may hamper transfer of heat to the area that is likely to be overheated.

The lower protective bracket coupling portion 732g may make contact with the inside of the main case 51g so as to meet the sensible heat insulation pipe 341g, with the main case 51g corresponding to the sensible heat exchanger case therebetween. Furthermore, the upper protective bracket coupling portion 733g may make contact with the inside of the combustion chamber case 21g so as to meet the combustion chamber heat insulation pipe 241g, with the combustion chamber case 21g therebetween. Accordingly, the protective bracket 73g may be cooled by the sensible heat insulation pipe 341g and the combustion chamber heat insulation pipe 241g and may help with the thermal insulation action of the above-described air layer.

The protective bracket 73 may further include a protective bracket connecting portion 734g located between the lower protective bracket coupling portion 732g and the protective bracket body 731g. The protective bracket connecting portion 734g may be brought into close contact with the inside of the main case 51g.

Figure 17:
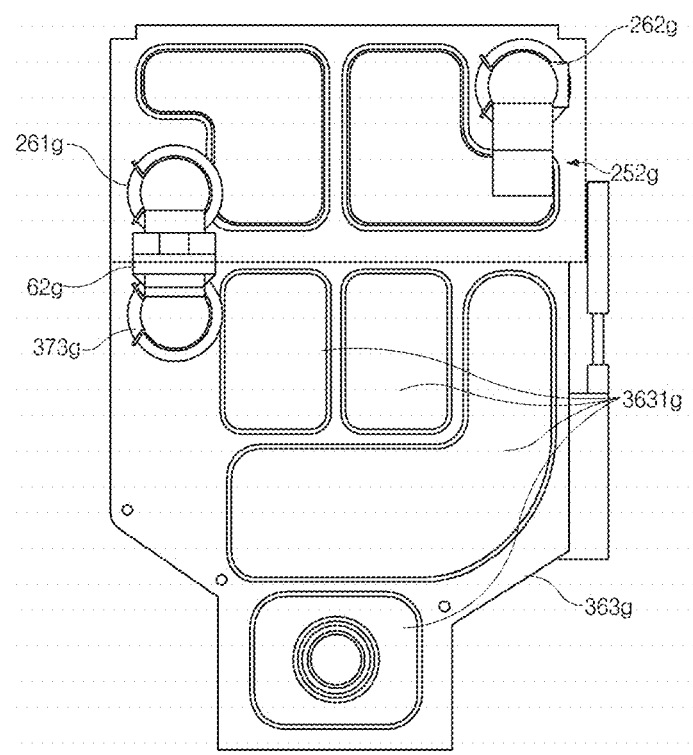
FIG. 17 is a front view of a heat exchanger unit according to a third modified example of the embodiment of the present disclosure.
Figure 18:
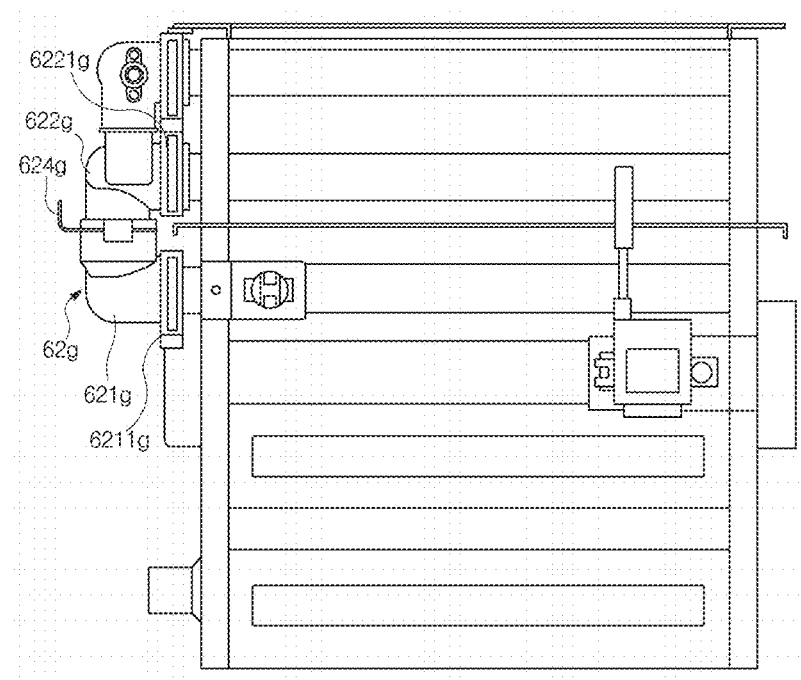
FIG. 18 is a side view of the heat exchanger unit according to the third modified example of the embodiment of the present disclosure.
Figure 19:
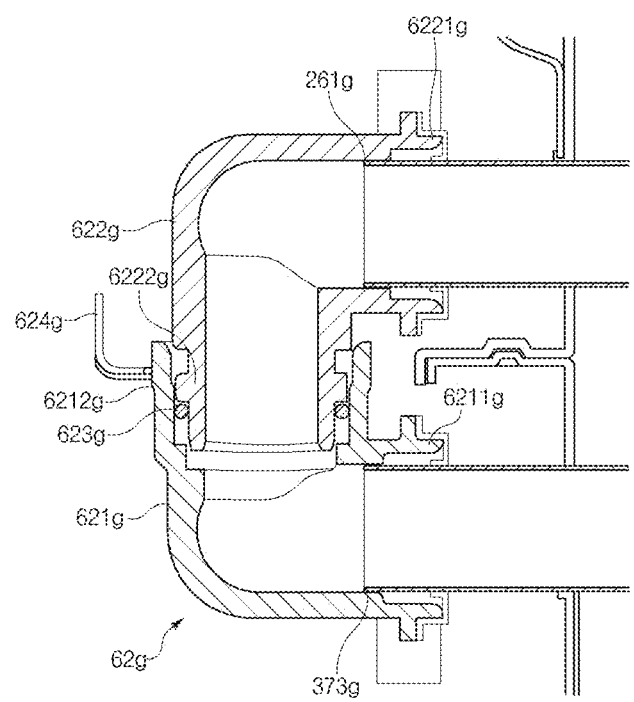
FIG. 19 is a vertical sectional view of a connecting adaptor of the heat exchanger unit and an area adjacent thereto according to the third modified example of the embodiment of the present disclosure.

FIG. 17 is a front view of a heat exchanger unit according to a third modified example of the embodiment of the present disclosure. FIG. 18 is a side view of the heat exchanger unit according to the third modified example of the embodiment of the present disclosure. FIG. 19 is a vertical sectional view of a connecting adaptor 62g of the heat exchanger unit and an area adjacent thereto according to the third modified example of the embodiment of the present disclosure.

The connecting adaptor 62g of the heat exchanger unit according to the third modified example of the embodiment of the present disclosure will be described below with additional reference to FIGS. 17 to 19.

The connecting adaptor 62g included in the heat exchanger unit according to the third modified example of the embodiment of the present disclosure may connect a sensible heat flow passage formed by the sensible heat exchange pipe 32g and flow passage caps 3631g of the sensible heat exchanger 30g and a combustion chamber flow passage formed by the combustion chamber heat insulation pipes 24g. As illustrated, the connecting adaptor 62g may extend in the up/down direction to connect a heating-water discharge hole 373g formed in a third flow passage cap plate 363g located at the front and the combustion chamber supply hole 261g formed in the second combustion chamber flow passage cap plate 252g. To enable this flow passage structure, the third flow passage cap plate 363g may have a different shape from the second flow passage cap plate 362g of FIG. 6 such that the heating-water discharge hole 373g and the combustion chamber supply hole 261g are disposed on the same side.

The connecting adaptor 62g may be removably coupled to the heating-water discharge hole 373g and the combustion chamber supply hole 261g. The connecting adaptor 62g may include, at the top and bottom thereof, an upper connecting adaptor 622g and a lower connecting adaptor 621g connected with each other. The upper connecting adaptor 622g and the lower connecting adaptor 621g may be connected to the combustion chamber supply hole 261g and the heating-water discharge hole 373g, respectively, to connect the heating-water discharge hole 373g and the combustion chamber supply hole 261g. The upper connecting adaptor 622g may have an upper adaptor connecting portion 6221g that is one end coupled to the combustion chamber supply hole 261g, and the lower connecting adaptor 621g may have a lower adaptor connecting portion 6211g that is one end coupled to the heating-water discharge hole 373g.

The connecting adaptor 62g may further include a connecting adaptor O-ring 623g. The connecting adaptor O-ring 623g may be disposed between an upper adaptor coupling portion 6222g and a lower adaptor coupling portion 6212g by which the upper connecting adaptor 622g and the lower connecting adaptor 621g are connected. The connecting adaptor O-ring 623g may have elasticity and may maintain water-tightness between the upper connecting adaptor 622g and the lower connecting adaptor 621g.

The upper adaptor coupling portion 6222g may be inserted into and coupled to the lower adaptor coupling portion 6212g. This is to prevent leakage of heating-water even though water-tightness is not maintained by the connecting adaptor O-ring 623g when the heating-water flows through the connecting adaptor 62g.

A connecting adaptor clip 624g may be disposed on a portion where the upper connecting adaptor 622g and the lower connecting adaptor 621g are coupled with each other. The connecting adaptor clip 624g may more firmly couple the upper connecting adaptor 622g and the lower connecting adaptor 621g by pressing the upper connecting adaptor 622g and the lower connecting adaptor 621g inward. Furthermore, separate clips may be disposed on portions where the connecting adaptor 62g is coupled to the heating-water discharge hole 373g and the combustion chamber supply hole 261g. The clips may more firmly couple the connecting adaptor 62g to the heating-water discharge hole 373g and the combustion chamber supply hole 261g.

The upper connecting adaptor 622g and the lower connecting adaptor 621g may have the shape of "L". Accordingly, the connecting adaptor 62g formed by coupling the upper connecting adaptor 622g and the lower connecting adaptor 621g may have the shape of "U".

Figure 20:
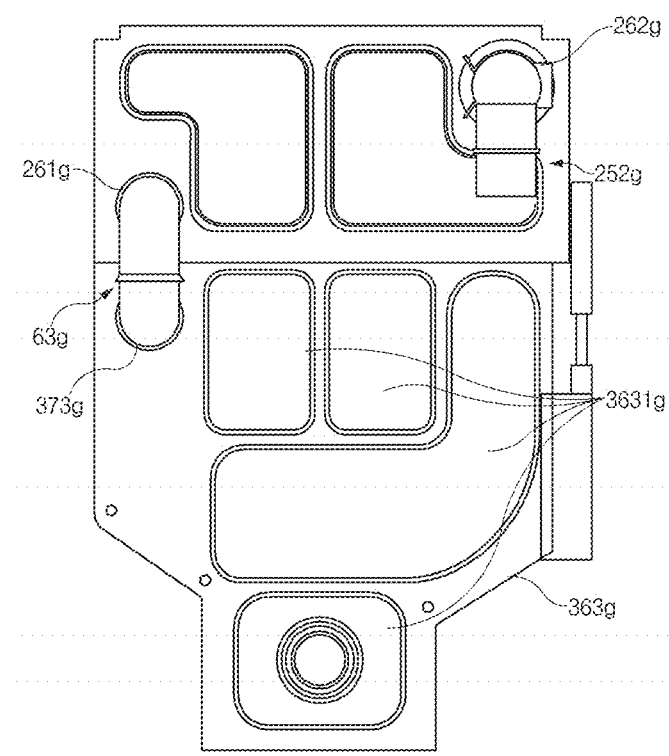
FIG. 20 is a front view of a heat exchanger unit according to a fourth modified example of the embodiment of the present disclosure.
Figure 21:
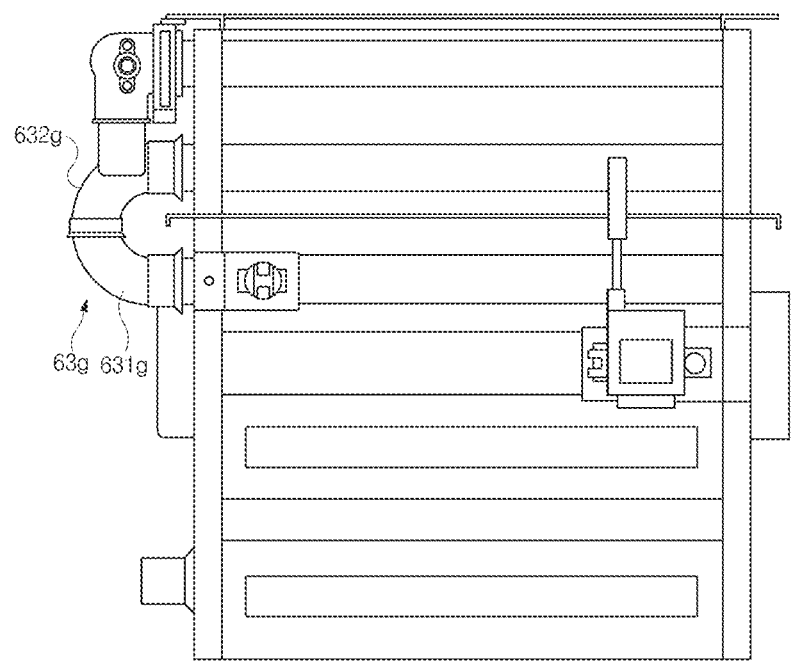
FIG. 21 is a side view of the heat exchanger unit according to the fourth modified example of the embodiment of the present disclosure.
Figure 22:
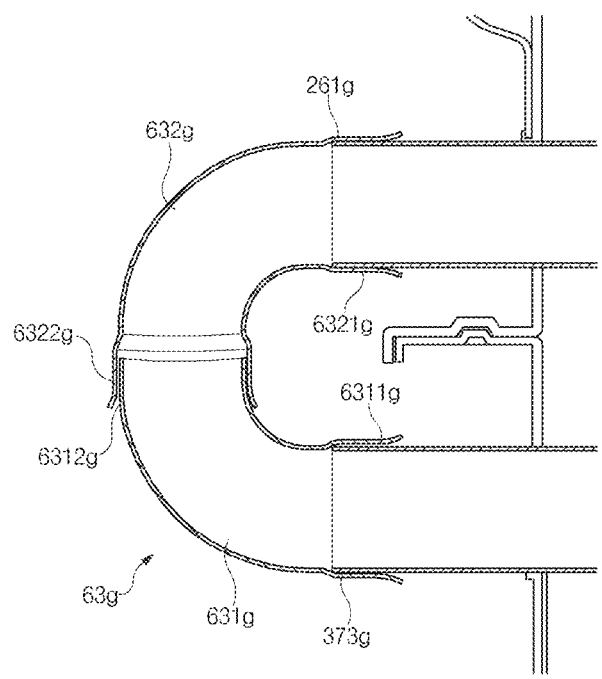
FIG. 22 is a vertical sectional view of an elbow pipe of the heat exchanger unit and an area adjacent thereto according to the fourth modified example of the embodiment of the present disclosure.

FIG. 20 is a front view of a heat exchanger unit according to a fourth modified example of the embodiment of the present disclosure. FIG. 21 is a side view of the heat exchanger unit according to the fourth modified example of the embodiment of the present disclosure. FIG. 22 is a vertical sectional view of an elbow pipe 63g of the heat exchanger unit and an area adjacent thereto according to the fourth modified example of the embodiment of the present disclosure.

The elbow pipe 63g of the heat exchanger unit according to the fourth modified example of the embodiment of the present disclosure will be described below with additional reference to FIGS. 20 to 22. The elbow pipe 63g may be formed of stainless steel. However, the material of the elbow pipe 63g is not limited thereto. Basically, the fourth modified example is the same as the third modified example. However, the fourth modified example differs from the third modified example in that in the fourth modified example, the elbow pipe 63g is disposed instead of the connecting adaptor 62g (refer to FIG. 17). Therefore, only the difference will be described below in detail.

The elbow pipe 63g may be removably coupled to the heating-water discharge hole 373g and the combustion chamber supply hole 261g. The elbow pipe 63g may include, at the top and bottom thereof, an upper elbow pipe 632g and a lower elbow pipe 631g connected with each other. The upper elbow pipe 632g and the lower elbow pipe 631g may be connected to the combustion chamber supply hole 261g and the heating-water discharge hole 373g, respectively, to connect the heating-water discharge hole 373g and the combustion chamber supply hole 261g. The upper elbow pipe 632g may have an upper pipe connecting portion 6321g that is one end coupled to the combustion chamber supply hole 261g, and the lower elbow pipe 631g may have a lower pipe connecting portion 6311g that is one end coupled to the heating-water discharge hole 373g.

The upper elbow pipe 632g and the lower elbow pipe 631g may have a curved shape. Accordingly, the elbow pipe 63g formed by coupling the upper elbow pipe 632g and the lower elbow pipe 631g may have the shape of "U".

A paste may be applied to the point where an upper pipe coupling portion 6322g and a lower pipe coupling portion 6312g are coupled, the point where the upper pipe connecting portion 6321g is coupled with the combustion chamber supply hole 261g, and the point where the lower pipe connecting portion 6311g is coupled with the heating-water discharge hole 373g. Through brazing, the coupled portions may be firmly coupled, and water-tightness of the corresponding portions may be maintained.

To allow the paste to be smoothly applied, the lower pipe coupling portion 6312g may be inserted into and coupled to the upper pipe coupling portion 6322g. As in FIG. 12, assembly and brazing processes are performed in a state in which the entire heat exchanger unit is turned upside down. Accordingly, the elbow pipe 63g illustrated in FIG. 22 is inverted in the assembly process, and therefore the lower pipe coupling portion 6312g may be inserted into the upper pipe coupling portion 6322g to prevent the paste between the lower pipe coupling portion 6312g and the upper pipe coupling portion 6322g from flowing down to the outside by the weight of the paste in the process of applying the paste before the brazing process.

Accordingly, heat transfer efficiency may not be deteriorated despite the use of an inexpensive and easy-to-manufacture fin-tube type heat exchanger unit.

Thus, the heat exchanger unit and the condensing boiler may have a high thermal insulation effect.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A heat exchanger unit comprising:
   a combustion chamber in which a flame caused by a combustion reaction is located;
   a heat exchanger for a condensing boiler, the heat exchanger being located under the combustion chamber, wherein the heat exchanger includes heat exchange pipes configured to receive heat generated by the combustion reaction and to heat heating-water flowing through the heat exchange pipes and a main case having the heat exchange pipes accommodated in an interior space thereof; and
   a combustion chamber heat insulation pipe disposed adjacent to the combustion chamber and configured to receive the heating-water and allow the heating-water to flow therethrough to thermally insulate the combustion chamber,
   wherein the combustion chamber includes a combustion chamber case configured to form an interior space in which the flame is located and a combustion chamber flange protruding from a lower end of the combustion chamber case,
   wherein the heat exchanger for the condensing boiler further includes a heat exchanger flange protruding from an upper end of the main case, the heat exchanger flange being coupled with the combustion chamber flange,
   wherein the combustion chamber and the heat exchanger for the condensing boiler are coupled by a brazing process of applying and heating a paste, and
   wherein the paste is applied between the combustion chamber flange and the heat exchanger flange so that no closed space surrounded by the combustion chamber flange and the heat exchanger flange is formed.

2. The heat exchanger unit of claim 1, wherein the combustion chamber heat insulation pipe includes a plurality of combustion chamber heat insulation pipes disposed adjacent to left and right sides of the combustion chamber and spaced apart from each other in an up/down direction.

3. The heat exchanger unit of claim 2, wherein the combustion chamber heat insulation pipes disposed on the left side of the combustion chamber have a common inlet, and
   wherein the combustion chamber heat insulation pipes disposed on the right side of the combustion chamber are fluidically connected with the combustion chamber heat insulation pipes disposed on the left side of the combustion chamber, respectively, to form a parallel flow passage.

4. The heat exchanger unit of claim 2, wherein the combustion chamber heat insulation pipes are sequentially connected in series to form a combustion chamber flow passage.

5. The heat exchanger unit of claim 2, wherein the combustion chamber includes:
   two general combustion chamber side plate portions spaced apart from each other in a fore/aft direction;
   two combustion chamber heat insulation side plate portions spaced apart from each other in a left/right direction and configured to form an interior space of the combustion chamber together with the two general combustion chamber side plate portions; and
   combustion chamber flow passage cap plates including combustion chamber flow passage caps configured to form connection spaces between the general combustion chamber side plate portions and the combustion chamber flow passage caps, and
   wherein to connect the combustion chamber heat insulation pipes, the connection spaces surround openings formed in end portions of the combustion chamber heat insulation pipes.

6. The heat exchanger unit of claim 1, wherein the combustion chamber flange protrudes outward from the lower end of the combustion chamber case, and
   wherein the heat exchanger flange protrudes outward from the upper end of the main case.

7. The heat exchanger unit of claim 6, wherein the combustion chamber flange includes a first coupling part,
   wherein the heat exchanger flange includes a second coupling part disposed in a position corresponding to a position of the first coupling part, the first coupling part being coupled to the second coupling part, and
   wherein one of the first coupling part and the second coupling part is a flange protrusion protruding from the corresponding flange, and the other is a flange through-hole into which the flange protrusion is fixedly inserted.

8. The heat exchanger unit of claim 6, wherein the heat exchanger flange includes a heat exchanger flange body extending outward from the main case and a heat exchanger flange bending portion extending downward from an outer end of the heat exchanger flange body, and
   wherein the combustion chamber flange includes a combustion chamber flange body extending outward from the combustion chamber case and a combustion chamber flange bending portion extending downward from an outer end of the combustion chamber flange body, the combustion chamber flange bending portion being configured to surround the heat exchanger flange bending portion from the outside.

9. The heat exchanger unit of claim 6, wherein the heat exchanger flange includes a heat exchanger flange body extending outward from the main case and a heat exchanger flange embossing protruding upward from the heat exchanger flange body, and
   wherein the combustion chamber flange includes a combustion chamber flange body extending outward from the combustion chamber case and a combustion chamber flange embossing protruding upward from the combustion chamber flange body, the combustion chamber flange embossing being formed in a position corresponding to a position of the heat exchanger flange embossing and inserted into a recess formed on a lower side of the heat exchanger flange embossing.

10. The heat exchanger unit of claim 1, wherein the heat exchanger for the condensing boiler includes:
   a sensible heat exchanger located under the combustion chamber, the sensible heat exchanger including a sensible heat exchange pipe and a sensible heat exchanger case configured to accommodate the sensible heat exchange pipe inside and to form the main case, the sensible heat exchange pipe being one of the heat exchange pipes configured to receive the heat generated by the combustion reaction and to heat the heating-water flowing through the heat exchange pipes; and
   a latent heat exchanger located under the sensible heat exchanger and configured to receive latent heat generated during a phase change of a combustion gas generated by the combustion reaction and to heat the heating-water, and
   wherein the heat exchanger unit further comprises a sensible heat insulation pipe disposed adjacent to the sensible heat exchanger case and configured to receive the heating-water and allow the heating-water to flow therethrough to thermally insulate the sensible heat exchanger.

11. The heat exchanger unit of claim 10, further comprising:
   a side plate packing configured to make contact with an inner surface of the sensible heat exchanger case to hamper, between the sensible heat insulation pipe and the combustion chamber heat insulation pipe, transfer of heat to the sensible heat exchanger case; and
   a packing bracket configured to support the side plate packing such that the side plate packing is sandwiched between the inner surface of the sensible heat exchanger case and the packing bracket and is brought into contact with the inner surface of the sensible heat exchanger case.

12. The heat exchanger unit of claim 11, wherein the packing bracket makes contact with the inner surface of the sensible heat exchanger case so as to meet the sensible heat insulation pipe, with the sensible heat exchanger case therebetween.

13. The heat exchanger unit of claim 10, further comprising:
   a protective bracket coupled to the sensible heat exchanger case and the combustion chamber, the protective bracket having a portion spaced apart from an inner surface of the sensible heat exchanger case and an inner surface of the combustion chamber to form an air layer configured to hamper, between the sensible heat insulation pipe and the combustion chamber heat insulation pipe, transfer of heat to the sensible heat exchanger case.

14. The heat exchanger unit of claim 13, wherein the protective bracket makes contact with the inner surface of the sensible heat exchanger case so as to meet the sensible heat insulation pipe, with the sensible heat exchanger case therebetween and makes contact with the inner surface of the combustion chamber so as to meet the combustion chamber heat insulation pipe, with the combustion chamber therebetween.

15. The heat exchanger unit of claim 10, wherein the sensible heat exchanger further includes a plurality of sensible heat fins formed in a plate shape perpendicular to a direction in which the sensible heat exchange pipe extends, the sensible heat exchange pipe being configured to pass through the plurality of sensible heat fins, and
   wherein a lower end of the combustion chamber heat insulation pipe is located above upper ends of the sensible heat fins.

16. The heat exchanger unit of claim 10, wherein the sensible heat exchange pipe and the sensible heat insulation pipe are connected together to form a sensible heat flow passage through which the heating-water flows,
   wherein the combustion chamber heat insulation pipe forms a combustion chamber flow passage through which the heating-water flows, and
   wherein the heat exchanger unit further comprises a connecting adaptor configured to connect the combustion chamber heat insulation pipe and the sensible heat insulation pipe such that the sensible heat flow passage and the combustion chamber flow passage are connected.

17. The heat exchanger unit of claim 11, wherein a sensible heat exchange area refers to an area in which the sensible heat exchange pipe is disposed, a latent heat exchange area refers to an area in which a latent heat exchange pipe included in the latent heat exchanger is disposed, a heat exchange area refers to an area including the sensible heat exchange area and the latent heat exchange area, and a reference cross-sectional area refers to a cross-sectional area of the heat exchange area defined on a plane perpendicular to a reference direction that is a flow direction of the combustion gas, and
   wherein the main case is provided such that a reference cross-sectional area of the most downstream side is smaller than a reference cross-sectional area of the most upstream side with respect to the reference direction, and the main case includes at least one section in which the reference cross-sectional area gradually decreases along the reference direction such that the combustion gas flows at higher speed in the latent heat exchange area than in the sensible heat exchange area.

* * * * *